(12) United States Patent
Uijlenbroek et al.

(10) Patent No.: US 11,453,186 B2
(45) Date of Patent: Sep. 27, 2022

(54) SYSTEMS AND METHODS FOR MAINTAINING AUTOMATED QUALITY CONTROL DURING TIRE MANUFACTURE USING SPECIALIZED RFID TAGS

(71) Applicant: FineLine Technologies, Norcross, GA (US)

(72) Inventors: Jos Uijlenbroek, Ophemert (NL); Jan Svoboda, Matthews, NC (US)

(73) Assignee: FINELINE TECHNOLOGIES, Norcross, GA (US)

( * ) Notice: Subject to any disclaimer, the term of this patent is extended or adjusted under 35 U.S.C. 154(b) by 0 days.

(21) Appl. No.: 17/299,939

(22) PCT Filed: Dec. 9, 2019

(86) PCT No.: PCT/US2019/065130
§ 371 (c)(1),
(2) Date: Jun. 4, 2021

(87) PCT Pub. No.: WO2020/118288
PCT Pub. Date: Jun. 11, 2020

(65) Prior Publication Data
US 2021/0354411 A1 Nov. 18, 2021

Related U.S. Application Data

(60) Provisional application No. 62/776,621, filed on Dec. 7, 2018.

(51) Int. Cl.
*G06K 19/06* (2006.01)
*B29D 30/00* (2006.01)
*G06K 19/077* (2006.01)

(52) U.S. Cl.
CPC .... *B29D 30/0061* (2013.01); *G06K 19/07764* (2013.01); *B29D 2030/0066* (2013.01); *B29D 2030/0083* (2013.01)

(58) Field of Classification Search
CPC ............ B29D 30/0061; G06K 19/07764
(Continued)

(56) References Cited

U.S. PATENT DOCUMENTS

| 3,741,696 A | 6/1973 | Greenwood |
| 2003/0155054 A1* | 8/2003 | Bell .................... B60C 23/0493 152/450 |

(Continued)

FOREIGN PATENT DOCUMENTS

| CN | 207976914 U | 10/2018 |
| JP | 2005-246844 A | 9/2005 |

(Continued)

OTHER PUBLICATIONS

International Search Report (ISR) for PCT/US2019/065130 dated Apr. 9, 2020 (4 pages).

(Continued)

*Primary Examiner* — Ahshik Kim
(74) *Attorney, Agent, or Firm* — Schumaker, Loop & Kendrick, LLP

(57) ABSTRACT

Disclosed herein are automated systems and methods utilizing a plurality of specialized RFID tags incorporated within various tire manufacturing components (e.g., mold segments, mold container, bladder plates, tire presses, and extrusion dies) that are able to readily track tire manufacture (Continued)

and identify defect source(s) while concurrently being configured to the harsh processes and temperatures of tire manufacture.

16 Claims, 14 Drawing Sheets

(58) Field of Classification Search
USPC .......................................................... 235/492
See application file for complete search history.

(56) References Cited

U.S. PATENT DOCUMENTS

| | | |
|---|---|---|
| 2011/0199187 A1 | 8/2011 | Davidowitz |
| 2014/0260424 A1 | 9/2014 | Warren |
| 2016/0048751 A1 | 2/2016 | Imbroglio |
| 2017/0357887 A1* | 12/2017 | Wei .................. G06K 19/07764 |
| 2017/0361661 A1* | 12/2017 | Wei .................. G06K 19/07764 |
| 2020/0130421 A1* | 4/2020 | Doyle ................... B60C 11/246 |
| 2021/0178836 A1* | 6/2021 | Spencer ............... H01L 23/5387 |
| 2021/0312253 A1* | 10/2021 | Cassidy ........... G06K 19/07722 |

FOREIGN PATENT DOCUMENTS

| | | |
|---|---|---|
| JP | 2009-184220 A | 8/2009 |
| JP | 2017-087648 A | 5/2017 |
| KR | 20140072496 A | 6/2014 |
| KR | 20150062371 A | 6/2015 |
| WO | 2015193746 A1 | 12/2015 |
| WO | 2018036038 A1 | 3/2018 |

OTHER PUBLICATIONS

Written Opinion (WO for PCT/US2019/065130 dated Apr. 9, 2020 (6 pages).
Office Action for Korean Application No. 10-2021-7021072 dated Dec. 23, 2021 with English Translation (6 pages).
Office Action for Japanese Application No. 2021-532122 dated Apr. 26, 2022 with English Translation (9 pages).
Supplementary European Search Report issued for European Pat. Appln. No. EP 19891881.5, dated Aug. 9, 2022 (4 pages).

* cited by examiner

30

40

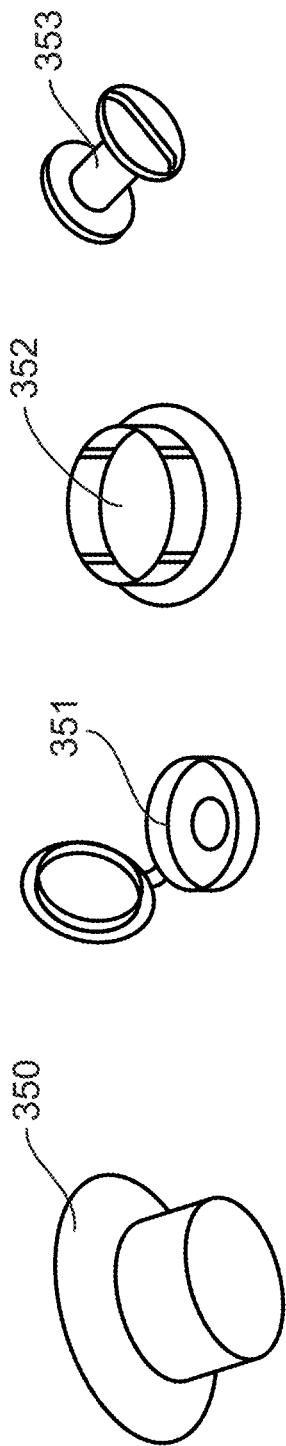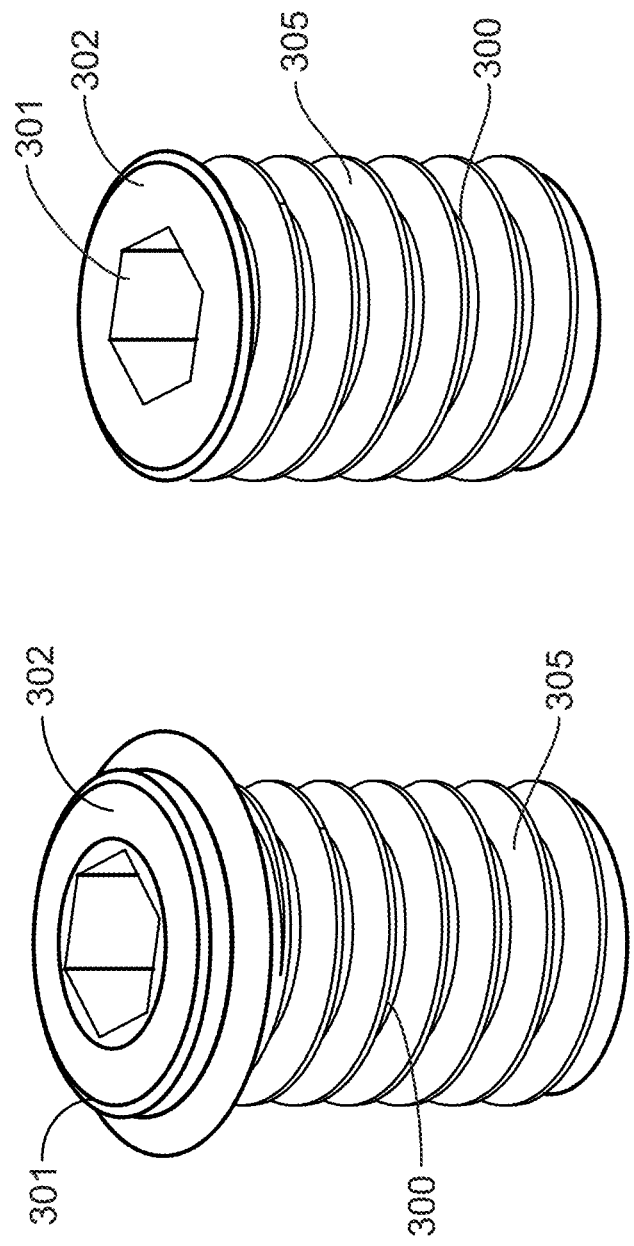

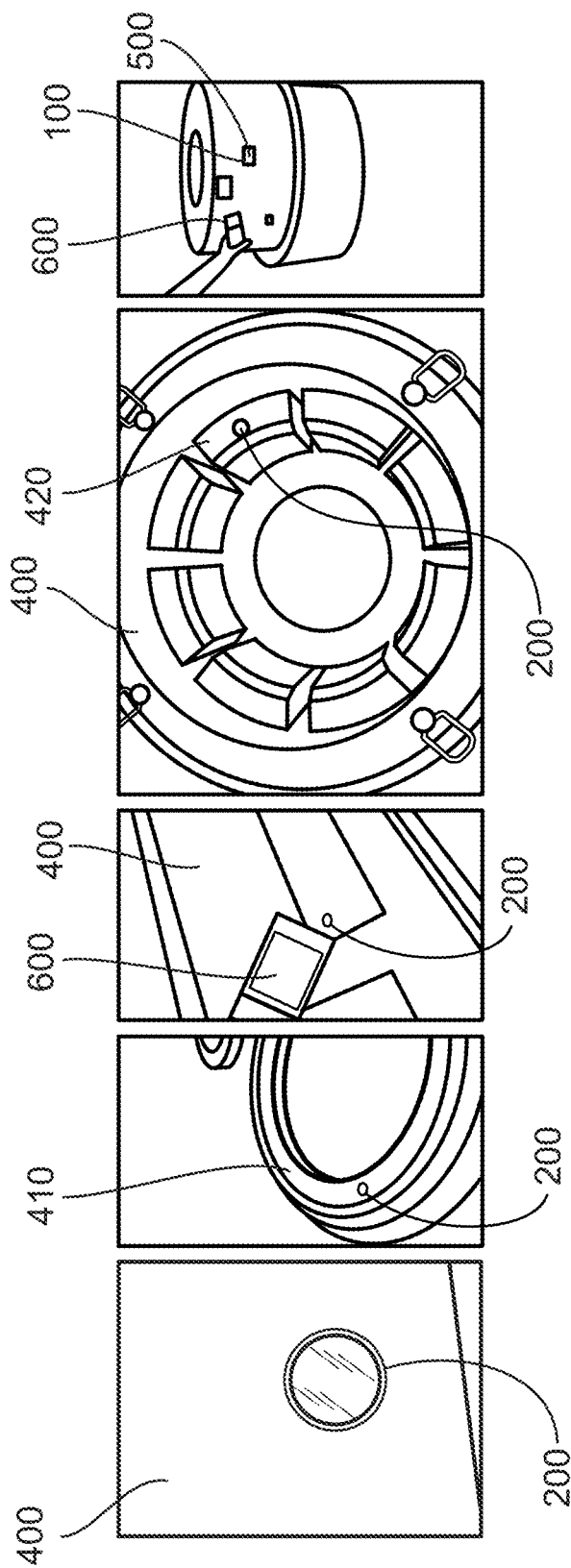

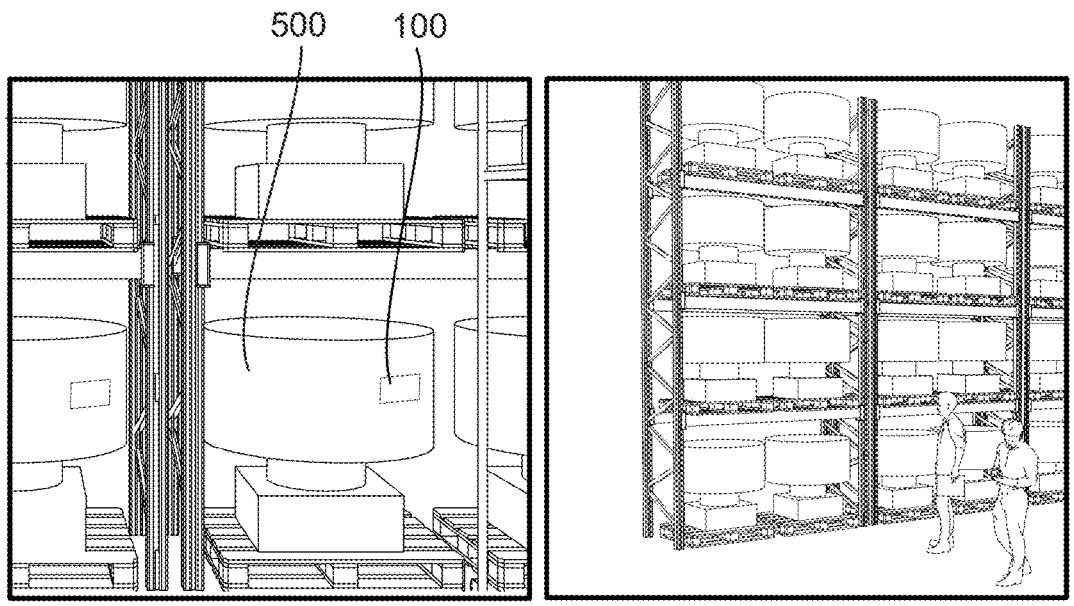
FIG. 11C
FIG. 11D
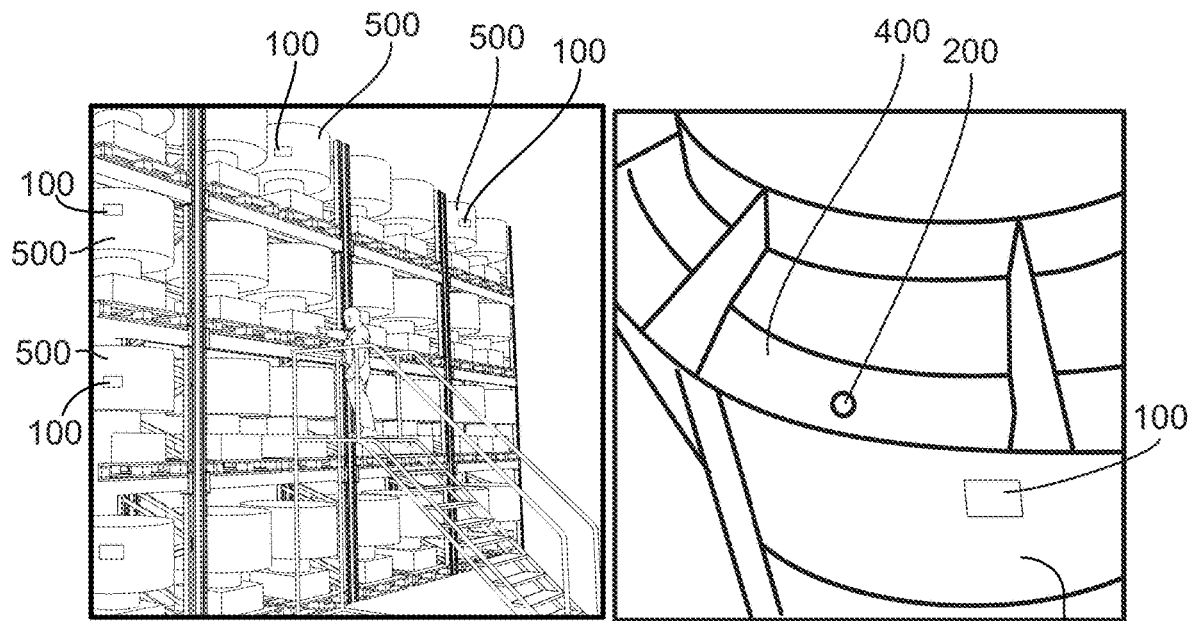
FIG. 11F
FIG. 11E

US 11,453,186 B2

SYSTEMS AND METHODS FOR MAINTAINING AUTOMATED QUALITY CONTROL DURING TIRE MANUFACTURE USING SPECIALIZED RFID TAGS

TECHNICAL FIELD

The disclosures herein generally relate to the field of RFID tags and tire manufacture, and more particularly, to systems and methods for electronically tracking and maintaining quality control and accurately and efficiently identifying defect sources during tire manufacture using specialized RFID tags placed within various and/or within all tire manufacturing components including, but not limited to, tire molds, shoes and/or segments, tire press(es), bladder(s), etc.

BACKGROUND

In general, 35% of tire quality is dependent on tire molds, bladders, presses and the individual parts within or around this production tooling during tire manufacture. In each case, there is a need to track and associate critical tooling components (mold segments), to count (or check) the sequence of those components within their carrier (e.g. mold container) and the carrier within the individual press, the press within the line of presses, and their overall use associated with individual tire(s) being produced, and potentially, even individual press operator(s).

Currently, the only way to identify these components, count the sequence(s) and couple them to a press is by using engraved numbers included in the steel or aluminum components and/or container and by manual paperwork. While this method is somewhat viable, mold(s), bladder(s) and press(es) used during tire manufacture are subjected to harsh environment(s) (i.e., vast temperature fluctuations (from 0° to 300° C.), ultrasonic cleaning 30 and laser cleaning 40 conditions (shown in FIGS. 2A and 2B respectively), sandblasting, welding, and vast changes in pH), and as a result, the engraved numbers wear over time becoming vague, dirty, damaged and difficult, if not impossible, to read.

FIGS. 1A, 1B, 1C, and 1D provide exemplary depictions of current methods, components, and manual labor used to identify press and mold quality during tire manufacture. As shown in FIGS. 1A-1D, tire producers attempt to manually identify and couple the different components 1 by using papers (2) and the engraved numbers and peripheral devices 3—these techniques overly relying on and requiring manual, paper-based labor that is often unreliable. For example, the tire manufacturing environment is not suitable for manual paperwork systems, papers often are lost and/or mixed and match with one another, fall off various manufacturing components, and can't be read anymore because of the environment. In addition, tire molds are often disassembled and re-assembled during tire manufacture. When tire molds are disassembled and reassembled, e.g. for maintenance, parts from one mold can easily be mixed with parts from other molds (used to produce the same type of tire). This mixing and matching of mold parts leads, in many cases, to a situation that there is no relation anymore between mold data (management system) and the actual mold itself, which further directly influences quality control during tire manufacture and overall tire quality.

Although the current methods, components, and manual labor identify defects during tire manufacture and maintain some form of quality control, it should be further noted that currently 6-10% of all new tires fail the final quality check and are subsequently discarded and/or recycled for new tire manufacture. The largest contributor to these quality rejections is related to the processes and tooling used to mold and cure tires—molds, bladders and presses. Specifically, there is a need at the precise moment (or very shortly thereafter) to identify the rejected tire after production, to identify the mold/press/bladder which is responsible for this rejection, and ideally have system checks to prevent manufacturing of defective and/or nonconforming products. However, when using conventional methods and processes to identify these defects, tire producers currently shut down multiple presses to investigate and identify which press, mold, bladder, is responsible for the failures, which leads to inefficiencies in overall tire production.

In addition to the above mentioned tire manufacturing problems, tire consumers over the years have become far more savvy and environmentally friendly and are requiring more transparency/traceability of production processes, thus resulting in a demand to produce tires in a more efficient, environmentally friendly manner while concurrently having a higher overall quality. In addition to the above, having more and more electric cars on the highways, will further push the tire industry to create safer tires since electric cars are heavier, more powerful and create new more extreme design and performance requirements on tires.

In view of the above, the tire market has demand(s) for a reliable automated solution(s) that identifies each component within all processes, as well as a method to identify tire molds, and couple the mold segments (and/or errors/defects occurring therein) during production automatically thereby concurrently and advantageously increasing tire quality during manufacture and overall tire production.

SUMMARY

It is an object of the invention to provide automated systems and methods using specialized RFID tags to reliably identify each tire manufacture component during tire manufacture (and service, maintenance, and/or repair) thereby increasing tire manufacture/production while further addressing the above mentioned shortcomings within the field. The present subject matter relates to an RFID application, which is based on a family of RFID tags specifically designed to support all extreme harsh processes within the environment of curing tires. The specially designed RFID tags are configured for and directly applied to (and within) metal surfaces of mold segments, mold container, bladder plates, tire presses, extrusion dies and other similar tools and machines used in the manufacturing of tires.

The tags are designed to optimally perform and operate when installed directly on and/or within metal (e.g., metal tire molds). The tags are also designed to operate in the harsh environment of tire molding where they are exposed to prolonged and cycling exposure to heat, harsh chemicals, dry ice, radiation, and/or humidity over time.

The method and materials used to install these tags are specifically formulated to ensure the individual tags perform to meet the individual use case requirement, the installation meets the environmental requirements and complies with wide range of tire manufacturing processes (tool service and installation, cleaning, normal operation, etc.).

This solution also includes a method if identifying individual tools and components, creating a logical hierarchy or association, associating the tools to each other and to manufacturing processes, materials and persons, and ultimately to each individual tire manufactured using those, and being able to perform checks and verifications against those. Next, this solution is designed in such a way that the "tool data"

can be associated to an individual tire. In case e.g. a tire shows a defect on the highway directly all data can be analyzed. Furthermore, many companies strive for more control of their production processes. Gathering "big data" transforming into predictive models will help to predict possible process failures before these failures appears.

Ultimately this leads to the ability to identify an individual tire, and trace it back through the manufacturing processes to press operator, press, mold, raw materials, and other tools used in the associated processed.

In certain aspects and of particular importance is the design of the physical RFID tag itself; the design of the RFID antenna to meet the requirements discussed herein; the use of materials of the RFID tag to withstand the harsh environments within the tire manufacturing industry, especially within tire curing area; and/or the embedding of the tags within and/or on the tire manufacturing components (segments, bladder, press, etc.) and/or container.

Disclosed is a kit comprising (a) a passive RFID equipped mold tag configured to be affixed to or within a recess of a surface in a tire mold (e.g., the recess may be formed on an outer surface of the tire mold and/or tire mold component including but not limited to a tire mold bead ring, tire mold segment/shoe, tire mold bladder/bladder component plate, etc., the outer surface may include either a portion of the mold that does not mold a tire during vulcanization or the outer surface may include a portion of the mold that molds the tire into a predetermined shape during vulcanization) and configured to withstand repeated thermal expansion and contraction associated with tire vulcanization; and (b) an epoxy or silicone based material configured to permanently affix the passive RFID equipped mold tag to or within the recess of the surface in the tire mold, the epoxy or silicone based material configured to withstand repeated thermal expansion and contraction associated with tire vulcanization.

In certain aspects the kit further comprises: (c) an RFID equipped mold tag configured to be affixed to an outer surface of a tire mold and/or a tire mold cover, the RFID equipped mold tag having a different construction and RFID read range than the passive RFID equipped mold tag and the RFID equipped mold tag configured to communicate unique identifiers associated with the tire mold and/or tire mold cover to which it is attached as well as having unique identifiers associated with the passive RFID equipped mold tag that is configured to be affixed to or within the recess of a tire mold.

In certain aspects, the passive RFID equipped mold tag of the kit is configured to be affixed to or within the recess of the surface in the tire mold comprises: (i) a passive RFID device configured for a passive RFID read range from 5 to 20 centimeters away from the passive RFID device; and (ii) a rigid housing completely housing the RFID device therein and is configured to withstand repeated thermal expansion and contraction associated with tire vulcanization. The rigid housing is formed of metal or metal alloy, a ceramic material, or a rigid polymer and includes a recess formed therein for receiving and housing the passive RFID device completely within the rigid housing. In certain aspects, the passive RFID device is permanently affixed to and housed within the rigid housing. In certain aspects, the rigid housing of the passive RFID equipped mold tag includes a planar head configured to house the passive RFID device therein and an elongate portion attached to and extending away from the planar head. In certain aspects, the elongate portion is configured to anchor the passive RFID equipped mold tag in the recess of the surface in the tire mold. In certain aspects, the elongate portion has a threaded outer diameter.

In alternative aspects, the passive RFID device is removably positioned within the rigid housing. In certain aspects, the rigid housing of the passive RFID equipped mold tag includes a planar head configured to removably house the passive RFID device therein and an elongate portion attached to and extending away from the planar head. In certain aspects, the planar head of the rigid housing of the passive RFID equipped mold tag includes a recessed portion configured to receive a removable press-fit or friction fit insert therein, the press-fit or friction fit insert including the passive RFID device therein. In certain aspects, the elongate portion is configured to anchor the passive RFID equipped mold tag in the recess of the surface in the tire mold. In certain aspects, the elongate portion has a threaded outer diameter.

In certain aspects, the RFID equipped mold tag of the kit is configured to be affixed to an outer surface of a tire mold has a read range ranging from 0.25 meters to 10 meters away from the RFID equipped mold tag.

In certain aspects, the RFID equipped mold tag of the kit comprises a flexible substrate and an RFID device embedded therein. In certain aspects, at least one outer surface of the flexible substrate of the RFID equipped mold tag is coated with silicone adhesive or epoxy adhesive for affixing the RFID equipped mold tag to the outer surface of the tire mold or the RFID equipped mold tag is configured for affixing to the outer surface of the tire mold by a fastener.

In certain aspects, the RFID device of the RFID equipped mold tag is equipped for passive RFID. In certain aspects, the RFID device of the RFID equipped mold tag is configured to identify a location of the tire mold and each specific tire mold components positioned therein as identified by unique identifiers associated with the passive RFID equipped mold tag, and the passive RFID equipped mold tags configured to communicate unique identifiers associated with individual components of the tire mold, the individual components comprising at least one of a mold shoe, a mold bead ring, mold bladder, or mold segment.

Also disclosed herein is a method for tracking tire manufacture and quality control with an RFID equipped tire mold system comprising: (a) providing an RFID equipped tire mold having a plurality of mold segments and/or mold shoes and/or mold bladder components that, when assembled and having a green unvulcanized tire positioned therein, are configured to impart a predetermined shape to a green unvulcanized tire during vulcanization; (b) providing a green unvulcanized tire; (c) placing the green unvulcanized tire of step (b) into the RFID equipped tire mold; (d) vulcanizing the green unvulcanized tire within the RFID equipped tire mold thereby forming a vulcanized tire; and (e) removing the vulcanized tire from the tire mold and inspecting the vulcanized tire formed in step (d) and determining whether any defects are present in the vulcanized tire, wherein: if no defects are present in the vulcanized tire after step (e), the vulcanized tire enters a supply chain and all data related to manufacture of the vulcanized tire with no defects is electronically stored within a database for review at a later date if necessary, but if defects are present in the vulcanized tire after step (e), further correlating a defect position on the vulcanized tire with the corresponding position in the RFID equipped tire mold based on unique RFID identifiers provided by the RFID equipped tire mold and further determining whether repair is necessary to portions of the RFID equipped tire mold and/or whether vulcanization parameters should be modified to prevent and/or reduce occurrence of defects in the vulcanized tire(s) formed in step (d).

In certain aspects, the RFID equipped tire mold of the above discussed method for tracking tire manufacture and quality control comprises a plurality of passive RFID equipped mold tags affixed to or within a recess(es) on an outer surface(s) (e.g., formed on outer surface(s)) of the plurality of mold segments in a tire mold that define predetermined sectors within the tire mold corresponding to outer surface(s) of the vulcanized tire that, during step (e), are correlated manually and/or electronically with any defects present in the vulcanized tire.

In certain aspects, in the method for tracking tire manufacture and quality control, an RFID equipped mold tag is affixed to an outer surface of a tire mold and/or a tire mold cover, the RFID equipped mold tag having a different construction and RFID read range than the passive RFID equipped mold tags affixed to or within the recess of the outer surfaces of the plurality of mold segments and the RFID equipped mold tag configured to communicate unique identifiers associated with the tire mold to which it is attached as well as having unique identifiers associated with the passive RFID equipped mold.

In certain aspects, in the method for tracking tire manufacture and quality control, the method further comprises, before step (a), locating the RFID equipped tire mold with unique RFID identifiers provided by the RFID equipped mold tag affixed to the outer surface of the tire mold and/or tire mold cover.

In certain aspects, in the method for tracking tire manufacture and quality control and, after locating the tire mold but before providing the green unvulcanized tire therein, confirming via unique RFID identifier(s) associated with the plurality of passive RFID equipped mold tags, as well as the RFID equipped mold tag affixed to the outer surface of the tire mold, that each mold segment associated with the RFID equipped tire mold having the RFID equipped mold tag is affixed to the outer surface is present.

In certain aspects, in the method for tracking tire manufacture and quality control, if a mold segment is not present, the method further comprises locating the missing mold segment via unique passive RFID identifiers associated therewith and pairing the missing mold segment with the tire mold having the RFID equipped mold tag is affixed to the outer surface.

In certain aspects, in the method for tracking tire manufacture and quality control, before step (c) and if an extraneous mold segment (i.e., a mold segment and/or component belonging with another tire mold) having a passive RFID equipped mold tag affixed thereto is present in the tire mold, the method further comprises identifying the extraneous mold segment by a unique RFID identifier associated therewith and pairing the extraneous mold segment with a proper tire mold, the proper tire mold having an RFID equipped mold tag is affixed to an outer surface of the proper tire mold having unique RFID identifiers associated with the proper tire mold to which it is attached as well as having unique identifiers associated with the passive RFID equipped tag affixed to the extraneous mold segment.

Also disclosed is a method of installing a passive RFID equipped mold tag within a tire mold segment comprising: (a) providing a tire mold segment (in this method tire mold segment refers to a tire mold bead ring, tire mold show/segment, tire mold bladder/bladder plate, etc.), the tire mold segment having a molding surface configured to impart a predetermined shape to a green unvulcanized tire during vulcanization; (b) providing a passive RFID equipped mold tag, the passive RFID equipped mold tag configured to provide a unique RFID identifier associated with the tire mold segment of step (a); (c) forming a recess on an outer surface of the tire mold segment; (d) securely positioning the passive RFID equipped mold tag within the recess of the outer surface of the tire mold segment so that the unique RFID identifier of the passive RFID equipped mold tag is securely associated with the tire mold segment.

In certain aspects, the recess of step (c) of the method of installing a passive RFID equipped mold tag within a tire mold segment is defined by sidewalls and a base connected to the sidewalls. In certain aspects, the base is substantially planar.

In certain aspects and with regard the method of installing a passive RFID equipped mold tag within a tire mold segment, the outer surface of the passive RFID equipped mold tag is positioned directly on and flush relative to an outer surface of the substantially planar base.

In certain aspects and with regard to the method of installing a passive RFID equipped mold tag within a tire mold segment, after directly positioning the RFID equipped mold tag on the outer surface of the substantially planar base, the passive RFID equipped mold tag is positioned either flush with or recessed relative to the outer surface of the tire mold segment on which the recess of step (c) is formed.

In certain aspects and with regard to the method of installing a passive RFID equipped mold tag within a tire mold segment, the method further comprises applying an epoxy or silicone material over the passive RFID equipped mold tag to securely position and maintain the passive RFID equipped mold tag within the recess formed on the outer surface of the mold segment.

In certain aspects and with regard to the method of installing a passive RFID equipped mold tag within a tire mold segment, the passive RFID equipped mold tag comprises: (i) a passive RFID device configured for a passive RFID read range from 5 to 20 centimeters away from the passive RFID device; and (ii) a rigid housing completely housing the RFID device therein and is configured to withstand repeated thermal expansion and contraction associated with tire vulcanization.

In certain aspects and with regard the method of installing a passive RFID equipped mold tag within a tire mold segment, the rigid housing is formed of metal or a metal alloy, a ceramic material, or a rigid polymer and includes a recess formed therein for receiving and housing the passive RFID device completely within the housing.

In certain aspects and with regard the method of installing a passive RFID equipped mold tag within a tire mold segment, the passive RFID device is permanently affixed to and housed within the rigid housing.

In certain aspects and with regard the method of installing a passive RFID equipped mold tag within a tire mold segment, the rigid housing of the passive RFID equipped mold tag includes a planar head configured to house the passive RFID device therein and an elongate portion attached to and extending away from the planar head.

In certain aspects and with regard the method of installing a passive RFID equipped mold tag within a tire mold segment, the elongate portion is configured to anchor the passive RFID equipped mold tag in the recess of the outer surface in the mold segment.

In certain aspects and with regard the method of installing a passive RFID equipped mold tag within a tire mold segment, the elongate portion has a threaded outer diameter and is configured to engage the sidewalls defining the recess formed on the outer surface of the tire mold in step (c).

In certain aspects and with regard the method of installing a passive RFID equipped mold tag within a tire mold segment, the passive RFID device is removably positioned within the rigid housing.

In certain aspects and with regard the method of installing a passive RFID equipped mold tag within a tire mold segment, the rigid housing of the passive RFID equipped mold tag includes a planar head configured to removably house the passive RFID device therein and an elongate portion attached to and extending away from the planar head.

In certain aspects and with regard the method of installing a passive RFID equipped mold tag within a tire mold segment, the planar head of the rigid housing of the passive RFID equipped mold tag includes a recessed portion configured to receive a removable press-fit or friction fit insert therein, the removable press-fit or friction fit insert including the passive RFID device therein.

In certain aspects and with regard the method of installing a passive RFID equipped mold tag within a tire mold segment, the elongate portion is configured to anchor the passive RFID equipped mold tag in a recess in the tire mold.

Also disclosed is an RFID equipped tire mold comprising: (a) an outer covering; and (b) a plurality of mold segments positioned within the outer covering, wherein: the outer covering is configured to identify with RFID the location of the RFID equipped tire mold and the plurality of mold segments associated with the RFID equipped tire mold. In this aspect, an RFID equipped mold tag is affixed to an outer surface of the outer covering of the RFID equipped tire mold, the RFID equipped mold tag is configured to identify with RFID the location of the RFID equipped tire mold and the plurality of mold segments associated with the RFID equipped tire mold. In certain aspects, the RFID equipped tire mold further comprises a passive RFID equipped mold tag affixed to or within a recess of a surface (formed on an outer surface) of at least one mold segment of the plurality of mold segments in the tire mold. In this aspect, the RFID equipped mold tag affixed to the outer covering of the RFID equipped tire mold has a different construction and RFID read range than the passive RFID equipped mold tag affixed to or within the recess of the surface of at least one mold segment of the plurality of mold segments in the tire mold. In this aspect, the RFID equipped mold tag affixed to the outer surface of the outer covering of the RFID equipped tire mold communicates to an RFID reader unique identifiers associated with the tire mold to which it is attached as well as having unique identifiers associated with the passive RFID equipped mold tag affixed to an outer surface of the outer covering of the RFID equipped tire mold. In this aspect, the RFID equipped mold tag affixed to the outer surface of the outer covering of the RFID equipped tire mold has a read range ranging from 0.25 meters to 10 meters. In this aspect, the passive RFID equipped mold tag affixed to or within the recess of the surface of at least one mold segment of the plurality of mold segments in the tire mold has a read range from 5 to 20 centimeters away from the passive RFID mold tag. In this aspect, each molding segment of plurality of mold segments having mold surfaces includes at least one passive RFID equipped mold tag affixed to or within a recess of each surface of each molding segment of the plurality of mold segments.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which:

FIGS. 3A, 3B, 3C, 3D, 3E, 3F, 3G, 3H, 3I, 3J, and 3K depict various configurations of the RFID tags (e.g., in the form of screws and plugs) used in the methods and systems disclosed herein;

FIGS. 5A, 5B, 5C, 5D, 5E, 5F, and 5G depict various tire manufacturing components, including tire mold segments, bead ring of the tire mold, extrusion blade, and the mold container respectively, having the disclosed RFID tags positioned therein and/or thereon;

FIGS. 11C, 11D, 11E, and 11F depict exemplary molds being placed within the warehouse with each mold having RFID tags that support a search and find function to easily locate a specific mold within the warehouse.

DETAILED DESCRIPTION

The present invention will now be described more fully hereinafter with reference to the accompanying drawings in which exemplary embodiments of the invention are shown.

However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

As shown in FIGS. 3A-11F and as further discussed below, disclosed herein are automated systems and methods utilizing a plurality of specialized RFID tags (e.g., 100, 200, and/or 300) incorporated within various tire manufacturing components (e.g., mold bead rings 410, mold segments 420, mold container 500, bladder(s)/bladder plates 430, tire presses, and extrusion dies) that are able to readily track tire manufacture and identify defect source(s) while concurrently being configured to withstand the harsh processes and temperatures of tire manufacture.

Physical Design of RFID Tag

Figure 1A:
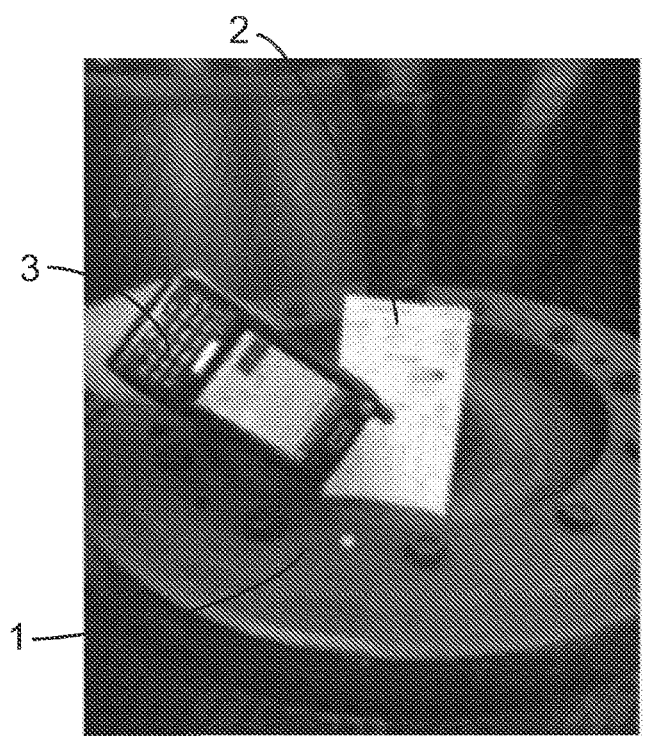
FIGS. 1A, 1B, 1C, and 1D depict current manual labor methods associated with analyzing tire mold, press, and bladder quality and reliability.
Figure 1B:
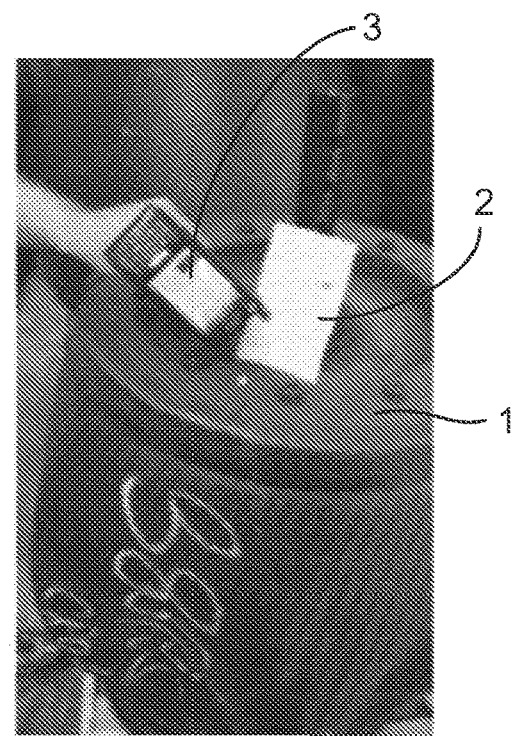
Figure 1C:
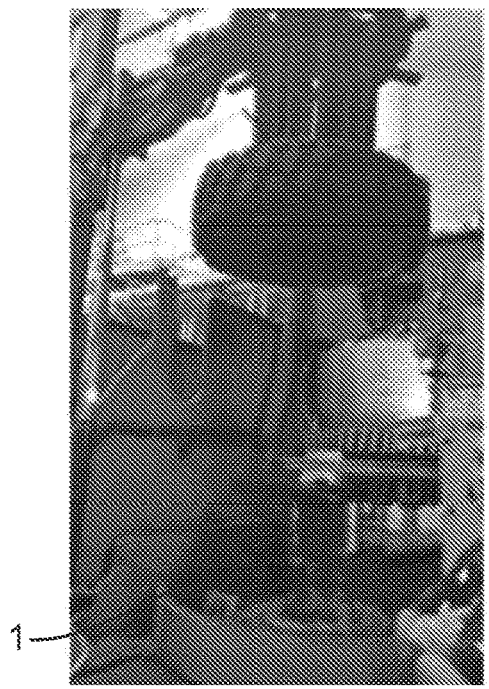
Figure 1D:
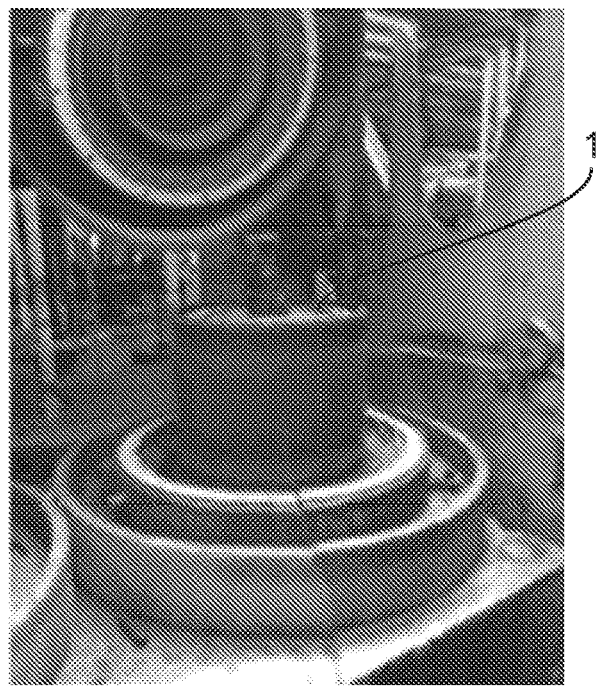
Figure 2A:
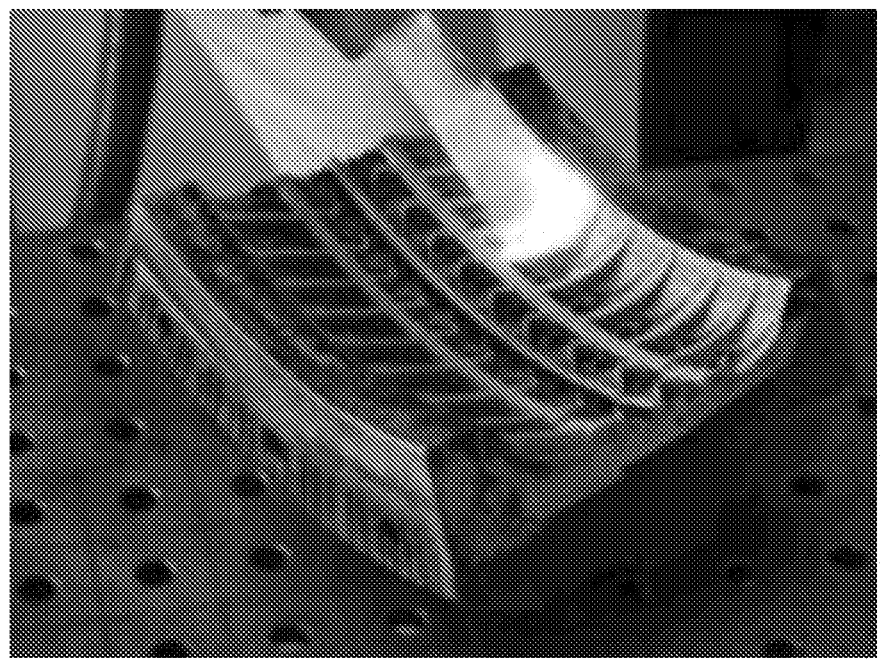
FIGS. 2A and 2B depict harsh, laser and ultra-sonic cleaning techniques currently used to clean portions of tire molds and presses.
Figure 2B:
Figure 3A:
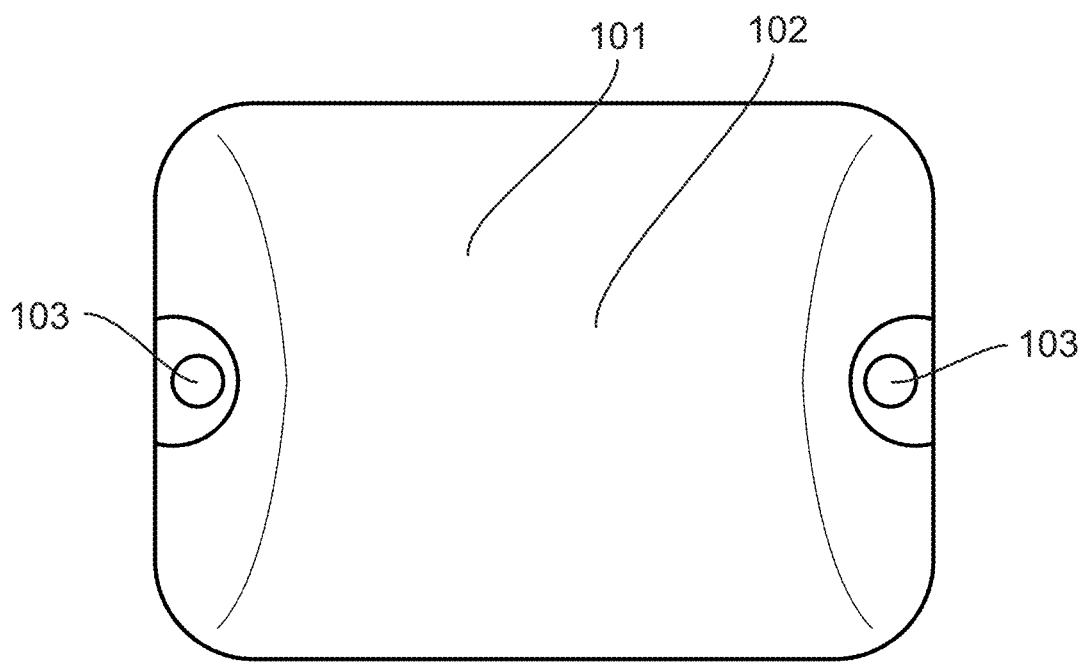
Figure 3A:
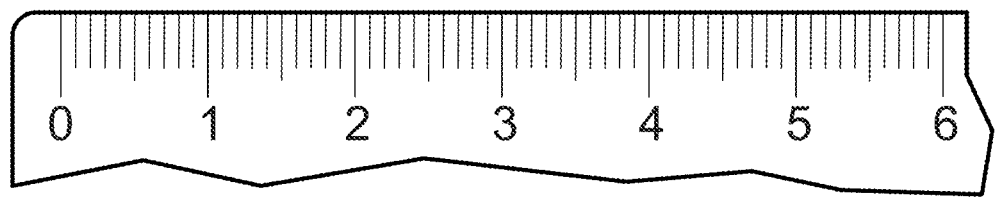
Figure 10C:
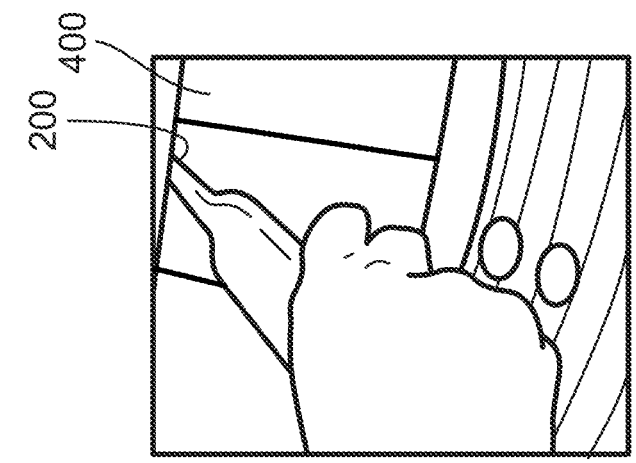
FIG. 10A-10C depict RFID tags being positioned in various portions of the mold and the readability capabilities of these RFID tags.
Figure 10B:
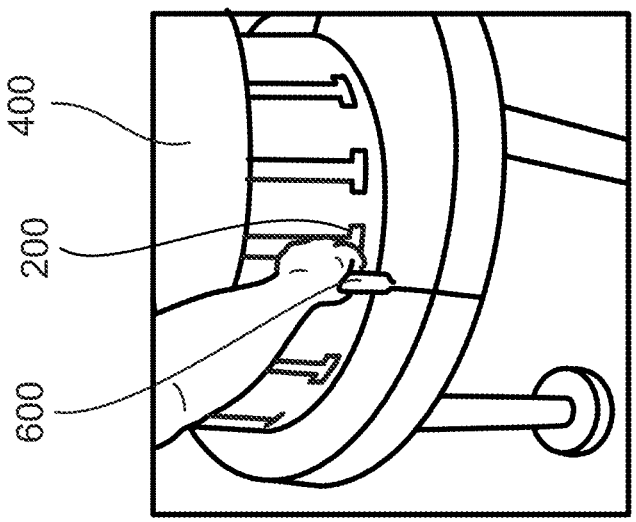
Figure 10A:
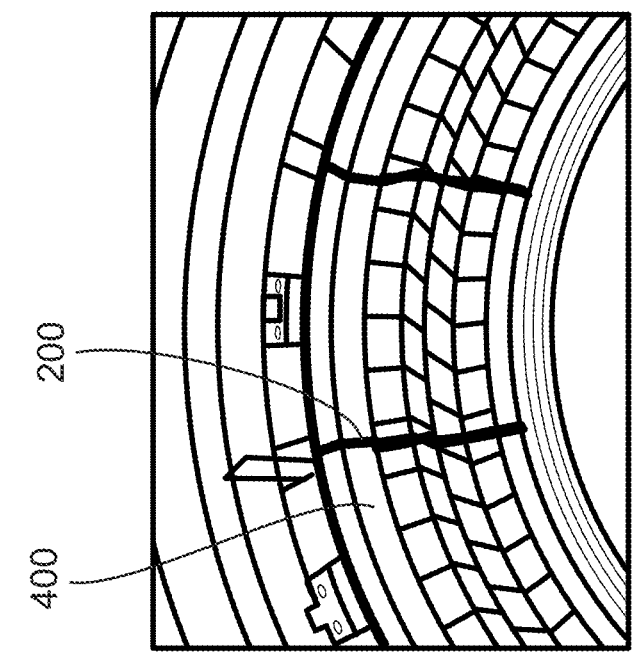
Figure 11A:
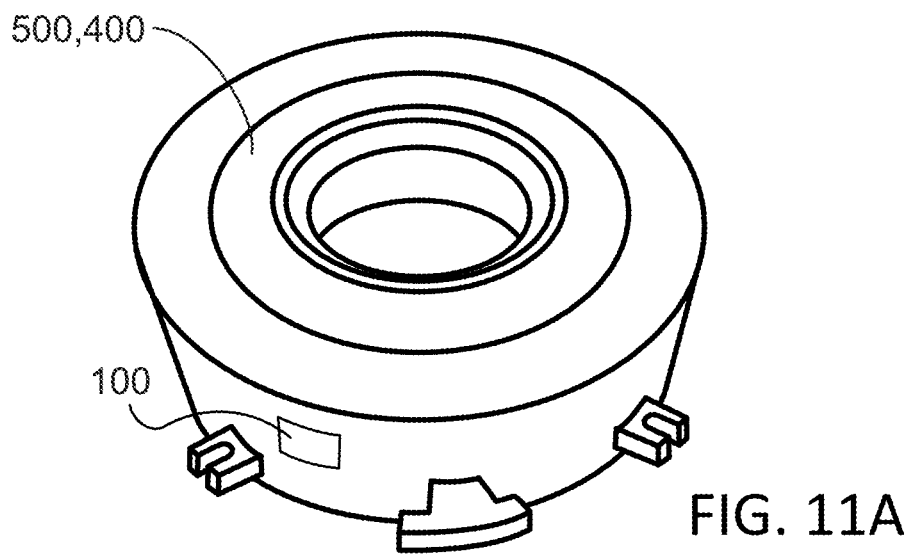
FIGS. 11A and 11B depict mold being transported from production to mold warehouse.
Figure 11B:
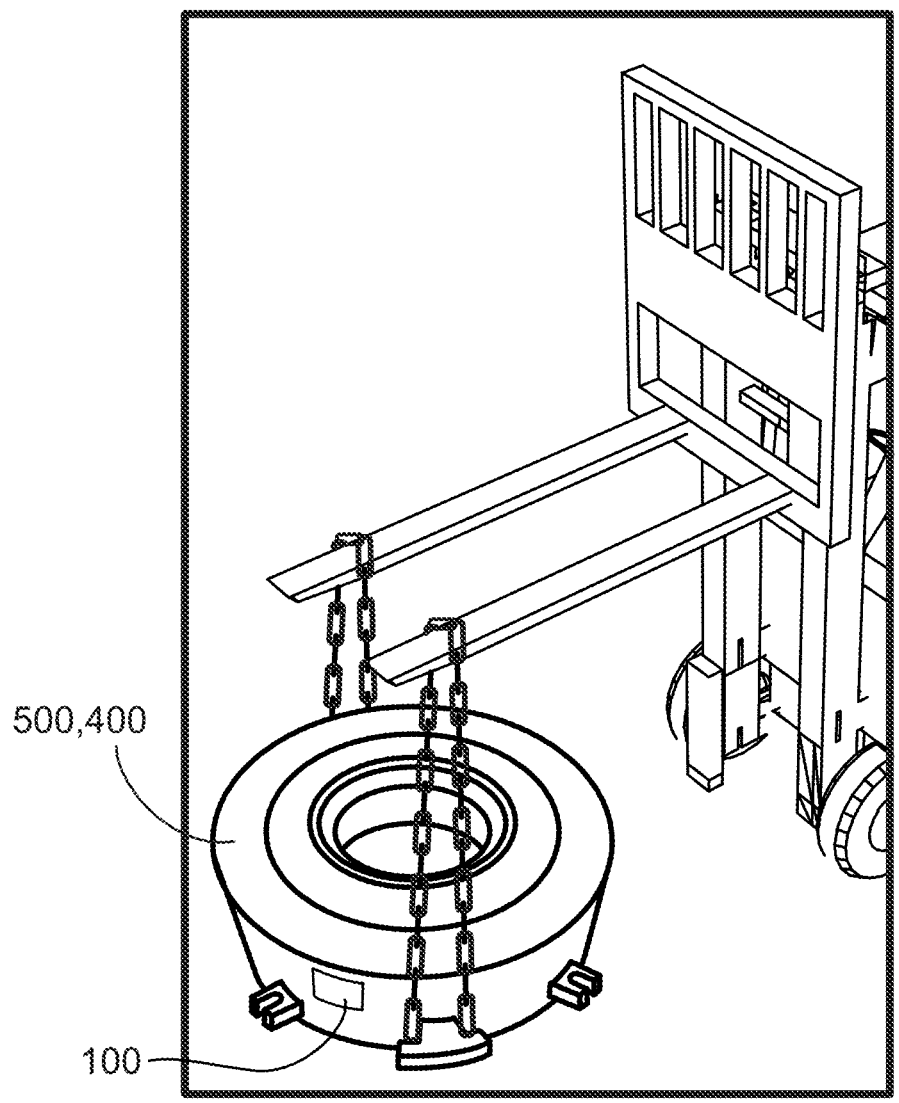

FIGS. 3A, 3B, 3I, and 3J depict the various different physical designs and configurations of the RFID Tags disclosed herein. For example, FIG. 3A depicts a large RFID Tag 100 (also referred to as the "mother tag" or "RFID equipped mold tag" discussed further below) that is configured for attachment to the mold (i.e., an outer surface not subjected to vulcanization) and/or mold cover/container 500 (e.g., as shown in FIGS. 11A, 11B, 11C, and 11F). As shown in FIG. 3A, large RFID Tag 100 (also referred to as the "mother tag" or "RFID equipped mold tag") is formed of a flexible material 101, preferably a flexible, elastomeric material (e.g., a temperature resistant silicone material capable of withstanding temperatures ranging from 50° C. to 350° C., ranging from 50° C. to 300° C., or from 50° C. to 250° C.) having a predetermined shape (a planar shape is preferred), in order to be fitted, affixed, and/or fastened on the mold or mold container. The large RFID Tag 100 (also referred to as the "mother tag" or "RFID equipped mold tag") further includes an RFID device 102 embedded within the flexible material. The RFID device 102 may be equipped for passive and/or active RFID with an RFID reader (e.g., 600 as shown in FIGS. 10B and 10C) and preferably has a long distance read range ranging from 0.25 meters to 15 meters away from the RFID reader, from 0.25 meters to 10 meters away from the RFID reader, from 0.5 meters away to 10 meters away from the RFID reader, from 1 meter away to 10 meters away from the RFID reader, from 2. 5 meters away to 8 meters away from the RFID reader. As further shown in FIG. 3A, the large RFID Tag 100 (also referred to as the "mother tag" or "RFID equipped mold tag") may be placed on/fitted to an outer surface of the tire mold and/or mold cover 500 and affixed and/or fastened thereto using an adhesive/epoxy (not shown) coated on tag 100 and/or via a plurality of through holes 103 and complementary fasteners configured to fasten the tag 100 to an outer surface of the tire mold and/or mold cover 500.

Figure 3B:
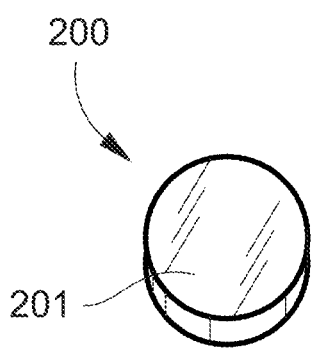
Figure 3B:
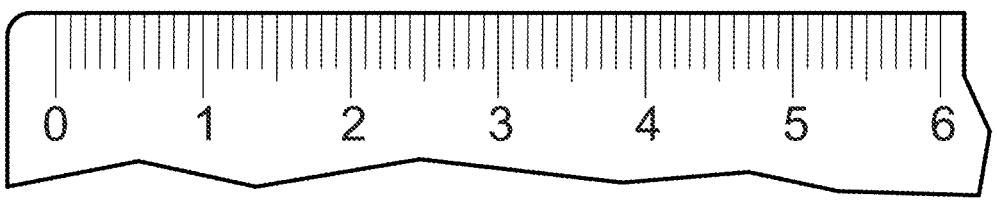
Figure 3I:
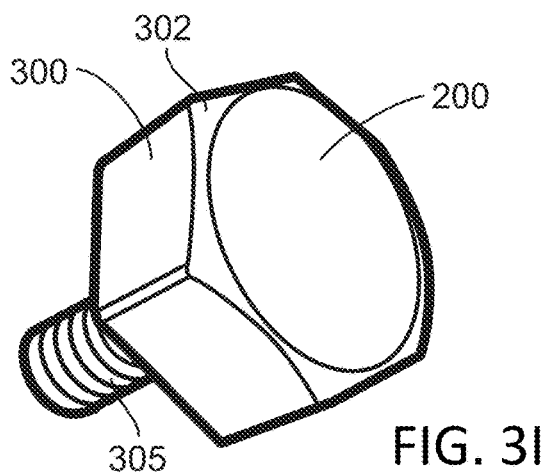
Figure 3J:
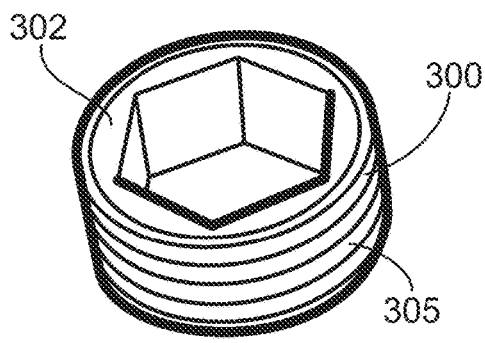
Figure 3K:
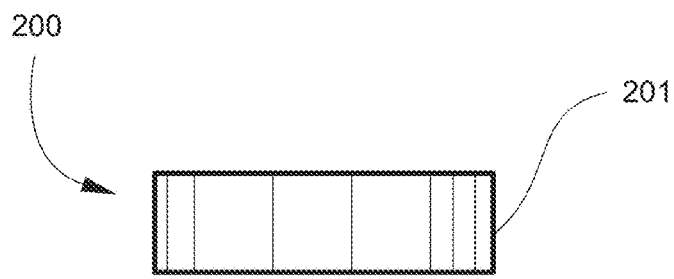

FIG. 3B and 3J respectively depict a top perspective view and a side view of the RFID Tag 200 having a solid cylindrical form (also referred to as the "child tag" or "small tag" or "passive RFID equipped mold tag" herein) that may be positioned and/or fixedly attached to a segment of a mold as shown in, for example, FIGS. 5A and 5D. In particular, the RFID Tag 200 ("passive RFID equipped mold tag") of FIG. 3B includes and RFID device 202 embedded within an a rigid and low thermally conductive material such as a metal or metal alloy (e.g., aluminum), ceramic, and/or a polymeric material such as thermoplastic polyurethane (TPU) or polyetheretherketone (PEEK), which are discuss further below. A rigid and low thermally conductive material is preferred to increase overall durability and lifespan of RFID Tag and more particularly RFID device 202 embedded within the tag once the tag has been affixed within portions of the tire mold as discussed further herein. In addition, RFID device 202 may be equipped for passive and/or active RFID with an RFID reader having a read range of from 1 to 20 centimeters away, 2.5 to 20 centimeters away, or 5 to 20 centimeters away from the RFID reader. In certain preferred aspects, RFID Tag 200 ("passive RFID equipped mold tag") is equipped for passive RFID a read range of from 1 to 20 centimeters away, 2.5 to 20 centimeters away, or 5 to 20 centimeters away from the RFID reader.

Figure 4A:
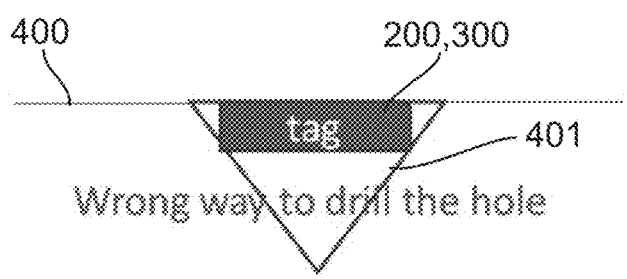
FIGS. 4A and 4B are schematic depictions of the improper and proper methods for positioning the disclosed RFID tags in the various tire manufacturing components.
Figure 4B:
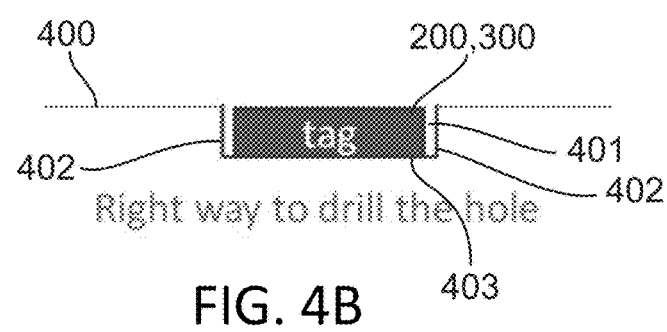

In view of FIGS. 3C-3K, the RFID Tag 200 ("passive RFID equipped mold tag") may have multiple different constructions. For example, and as specifically shown in FIGS. 3G-3J, the RFID Tag 200 further may include and/or be affixed within a rigid housing 300 (e.g. a recess 301 formed in rigid housing 300) configured to withstand repeated thermal expansion and contraction associated with tire vulcanization in which the RFID Tag 200 may be permanently or removably inserted/housed therein. The rigid housing 300 is formed of metal or metal alloy (e.g., aluminum), a ceramic material, or a rigid polymer (e.g., thermoplastic polyurethane (TPU) or polyetheretherketone (PEEK)) and includes a recess formed therein for receiving and housing the passive RFID device completely within the rigid housing. In certain aspects and as further shown in FIGS. 3G-3J, the rigid housing 300 of the passive RFID equipped mold tag 200 includes a planar head 302 configured to house the passive RFID device of RFID Tag 200 therein and an elongate portion 305 attached to and extending away from the planar head 302. In certain aspects, the elongate portion 305 as shown, for example, in FIGS. 3G-3J is configured to anchor the passive RFID equipped mold tag in the recess 401 (FIG. 4B) formed on a surface in the tire mold 400 (FIG. 4B). In certain aspects and as further shown in FIGS. 3G-3J, the elongate portion 305 has a threaded outer diameter. FIG. 3I depicts one embodiment in which the RFID Tag 200 (passive RFID equipped mold tag) is permanently inserted and/or affixed within rigid housing 300. As alluded to above and in certain further aspects, the RFID Tag 200 (passive RFID equipped mold tag) may be removably inserted within the rigid housing, and in this aspect, various covers and/or caps 350, 351, 352, 353 such as those depicted in FIGS. 3C-3F may receive and house RFID Tag 200 therein and may be further removably inserted within recess 301 of the rigid housings depicted, for example, in FIGS. 3G, 3H, 3I, and 3J and/or may be removably inserted directly on or within a portion of the tire mold. FIGS. 3C-3J depict various construction(s) that may house the RFID tags 200 and may be formed into screws (or cover screws, lock rings, helical or heli-coil inserts, and/or press-fit inserts) that house the disclosed RFID tags), bolts, and/or other forms having threaded portions that are configured to mate with portions of a tire mold, tire mold segment, a tire press, etc.

In certain aspects, the RFID tags 200 disclosed herein must perform and operate in the harsh environment of tire molding where they are exposed to prolonged and cycling exposure to heat and humidity over time. The RFID tags 200 disclosed herein preferably include UHF EPC Class 1 Gen 2 standard chip using an antenna (not shown) that is optimized for reading of the chip by using the metal of the mold itself (e.g., as shown in FIG. 4B). In certain aspects, the chip and antenna are packed into a ceramic layer to protect the RFID electronic components. Typical property of ceramic is that the electronic components will heat up and cool down slowly and constantly and will protect the chip and antenna firmly. In certain aspects, the ceramic RFID transponder is packed by an extra layer of epoxy to strengthen the construction into an extreme solid construction. This product is embedded into a thermoplastic polyurethane (TPU) tube or another durable polymeric material, such as polyetheretherketone (PEEK) that can withstand the thermal expansion(s) and contraction(s) associated with the harsh temperature and environment of vulcanization, which enables the construction to cope with the expansion and shrinking of the metal itself. The TPU is flexible enough to cope with these impacts during cleaning and usage. Although the RFID tags disclosed herein utilize TPU, other high temperature thermoplastics and thermoplastic resins may be included. In certain aspects, a TPU enclosure is also making the RFID tag easier to handle for installation, thanks to its size and shape. The bottom of the tag is enclosed by an extra layer of high temperature epoxy or, in case of the large design (large black container tag) one layer of high temperature silicone. The top is covered by the plastic itself.

Design and Function of RFID Tags

As disclosed above, in certain aspects, two different RFID mold tags are contemplated—one large "mother tag" (RFID equipped mold tag) 100 (FIG. 3A) to be applied on the mold container/cover 500 (shown, for example, in FIG. 11C) and one type of a very small RFID tag "child tag" ("passive RFID equipped mold tag") 200 embedded into the mold segments and other tooling components like mold shoes/segments 420, bead rings 410, bladder rings 430, extrusion dies such as those shown, for example, FIGS. 5A-5D, 5F, and 5G. These tags 100, 200 may be used to track/locate specific tire molds pre-tire manufacture, during tire manufacture, and post-tire manufacture to properly maintain the proper components of each tire mold therein (i.e., prevent mixing and matching of tire molds) and may be further used for quality control purposes.

Figure 9:
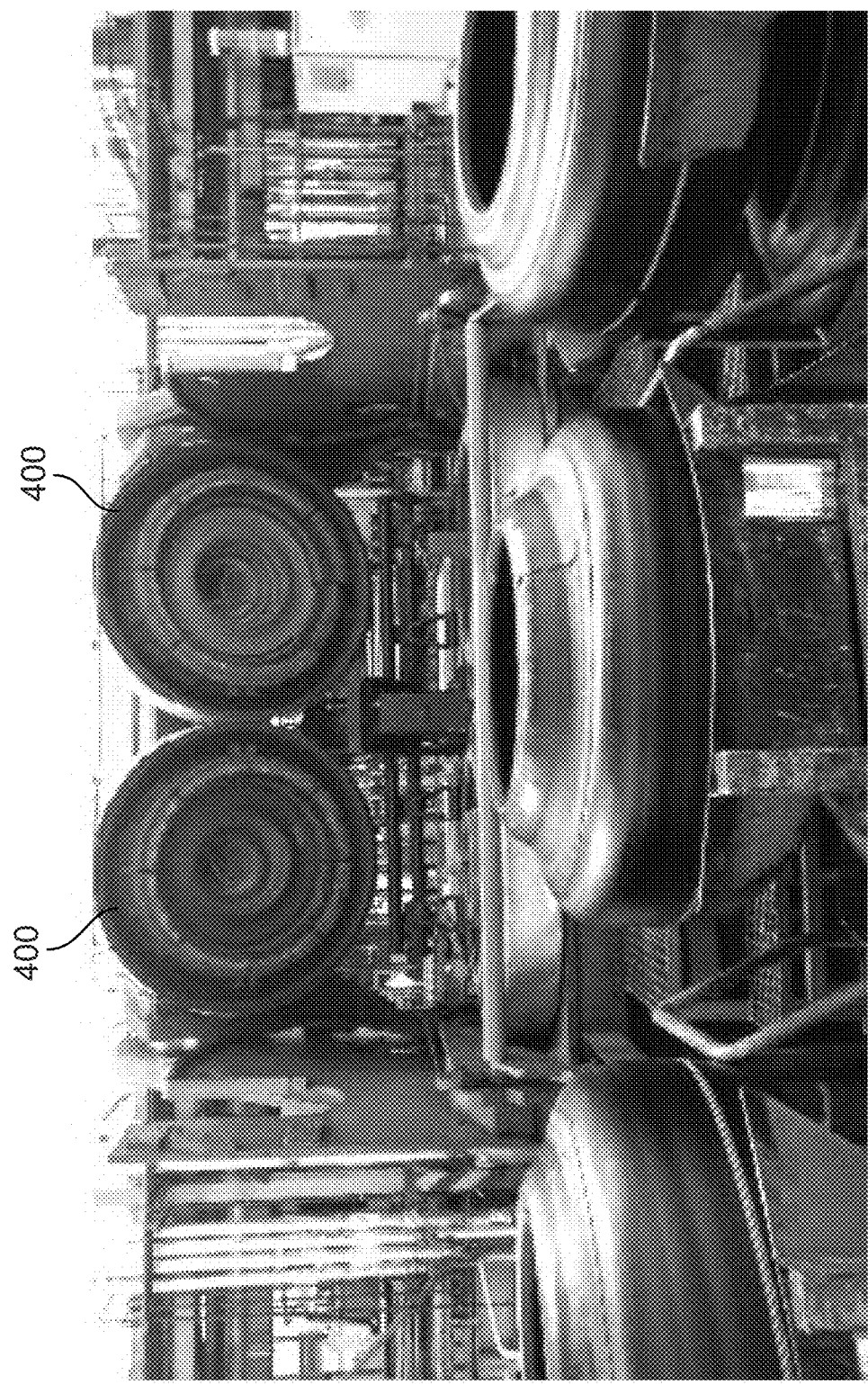
FIG. 9 depicts a mold during production having a mother tag positioned thereon operating at high temperature(s) and capable of being read from two meters away.

In certain aspects, the large RFID container tag 100 (also referred to as the "mother tag" or the "RFID equipped mold tag") is designed to have a long-range reading distance (of approximately 2-10 meters with current chips and reader antennas) under normal circumstances (between −10 and +40° C.) and specifically designed having a limited reading distance (of approximately two meters or less using current chip and reader antennas) when the mold is in production or preheating (temperature between 140 and 280° C.). Therefore the large RFID "mother tag" includes, but is not limited to, the following processes:

(1) Search and find the mold within the mold warehouse as shown, for example, in FIGS. 11A-11F (numeral 500 refers to the tire mold cover and/or tire the outer surface of a tire mold to which the large RFID Tag 100 (also referred to as the "mother tag" or "RFID equipped mold tag") is affixed to; numeral 400 generally refers to the various tire mold components (e.g., tire mold bead ring 410, tire segments and/or tire mold shoes 420, tire mold bladders 430) that are configured to impart a predetermined shape to a green unvulcanized tire during vulcanization);

(2) Identify the mold within production when mold, and therefore tag, is at a high operating temperature as shown in FIG. 9. The limited reading distance (of approximately two meters) when mold is in production is covering the need to identify specific mold from a fixed reading location on a press and coupling mold to the press. Since typically there are multiple presses with molds inline next to each other, it is important that the "high temperature reading" is limited in read range in order to avoid mixing molds and presses (3) To read the mold cover 500 and/or mold 400 while it is transported from production (having buildup of high internal temperature) by using an RFID fixed portal reader/antenna as shown, for example, in FIGS. 11A and 11B;

(4) To read the mold when it is transported from preheating (260° C.) to production by using an RFID portal reader;

The small RFID tag "child tag" 200 embedded within the components such as bead rings 410 and mold segments 420 (e.g., FIGS. 10A-10C) is designed to have a reading distance of approximately 5 to 15 centimeters with RFID reader 600, which is critical because:

(1) All mold segments can be read in sequence without reading any segment out of sequence. One of the main requirements within mold management is that segments within a container have a defined sequence, which is fixed and/or must be followed . This sequence is crucial for the quality of the product, and the tire itself. Since the segments and therefore the embedded tags are near to each other there is an absolute need to know which segment tag is being read (and not the one next to a segment). Therefore this specific RFID tag is specially designed for having a limited reading distance;

(2) Since a mold is built up after maintenance, all components will be connected to the mother tag, there is no need to read the small tag once the mold assembly is in production installed in a press and under high temperature/pressure. The design of the small embedded tag meets these requirements;

(3) The current subject matter meets the requirements of different types of molds. Mainly there are two different types of molds with and without so called "shoes", which are steel components to hold the segment inside the mold. The top of the segment in this case is covered by the shoe itself and therefore it is not possible to apply the tag on the top of the segment and to read the sequence. In this case the RFID tag will be embedded in the side of the segment or other surface which does not interfere with the production of the tire or with the functionality of the mold assembly itself Also, in this case, the tag needs to be read while it is in the container. The current subject matter meets this important requirement as well.

Materials Used

Since the mold segments 420, bead rings 410, bladder components 430, and other small mold components are embedded inside the mold/container itself these segments are under the most severe conditions when in tire production. These components are in direct contact with uncured rubber, which in many cases is under very high pressure using steam and heat to shape and cure the tire. Even while the mold is in production, some cleaning processes are used to clean the segments in production e.g. using dry-ice cleaning. Therefore, a number of specific materials were tested and identified that further enforce the RFID mold tag to survive as well as to stay attached on the segments, components and container itself.

The small round RFID tag 200 is embedded inside a 10 mm hole. The hole itself is at least 0.05 mm wider than the tag since it needs to cope with the shrinking and expansion of the steel or aluminum when exposed to heat and pressure. To prevent the RFID tag 200 from being involuntarily removed out of the tagged component (i.e., tire mold components) several methods to secure the tag inside the hole of the mold segment or tooling.

Figure 5F:
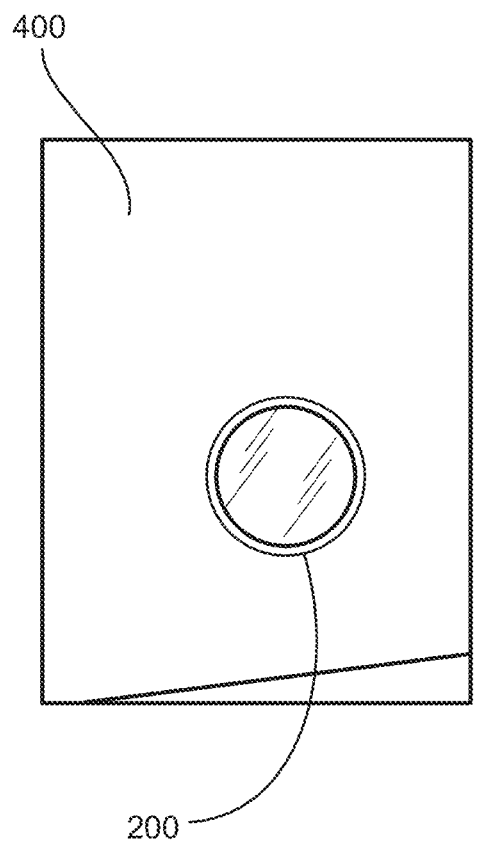

High temperature epoxy and/or high temperature silicone 500 such as that shown in FIG. 5H may be applied after placement of the tag 200 inside the hole,/recess formed on a portion of the tire mold. For example, one drop of high temperature epoxy (e.g., FIG. 5H) covers the RFID tag 200 within a recess formed on the tire mold (FIG. 5F). Although this is a very robust solution, there are some disadvantages in the use of epoxy (high temperature silicone) to secure the tag such as the process being time consuming and from employee safety not always preferable since the process may include exposure to toxic materials (e.g. epoxy hardener). High temperature silicone is preferred due to its availability and compatibility with tire manufacture in which the silicone prevents rubber from sticking to the top of the RFID tag and pull out the tag itself. Moreover, the use of silicone is critical for the RFID tag to properly function once installed, and surviving the environmental exposure over the life of the tire mold.

As shown in FIGS. 3C and 3D and if a tire producer for whatever reason doesn't want to use epoxy or high temperature silicone, "cover screw" with RFID capabilities may be used. These plastic screws do not influence the RFID signal and are easy to use. These plastic cover screws can be bought on the market or custom designed.

Figure 5G:
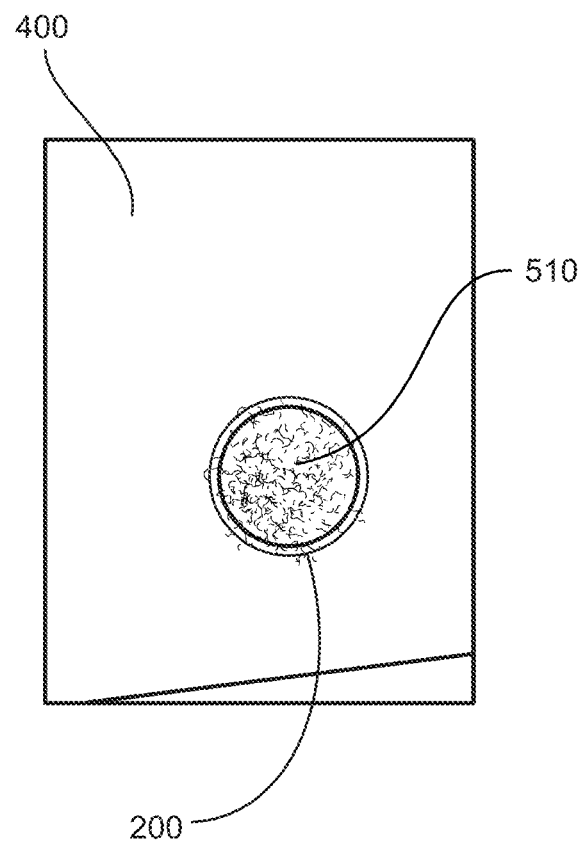

Installing/Embedding RFID Tags within and/or Onto the Mold Components and Container In certain aspects and to further ensure operability of the RFID tags 200 disclosed herein, the RFID tags are embedded in and/or onto the segments 420, bead rings 410, bladder components 430, and mold container 500 in a specific manner. For example, as shown in FIG. 4B, the small RFID tag 200 ("child tag") for the components such as bead rings and mold segments needs to be protected (e.g., tag is positioned within a recess 401 of the tire manufacturing component and has specific geometry) by the component itself Through testing, Applicant has determined that the following process(es) and geometrical shape results in preferred operable conditions for the RFID tags disclosed herein:

1. With reference to FIG. 4B (and FIGS. 5A-5G), drill/mill a hole/recess 401 having predetermined dimensions to fit RFID tag "child tag" 200, 300 therein ("passive RFID equipped mold tag") (e.g., a minimum diameter of 10 mm and maximum 6 mm depth) within a portion of the tire mold 400;

2. The bottom of the hole/recess 401 should be a flat, planar surface (base 403) as shown in FIG. 4B and not angled as shown in FIG. 4A;

3. By providing a flat, planar surface recessed 401 within the hole, the RFID tag 200, 300 will lay flat and be in full contact with the metal surface of the segment at bottom of the machined hole, thereby further enhancing the RF signal;

4. Optionally, but if preferred, the tag 200, 300 can be positioned firmly with a drop of conductive adhesive 510 (as shown in FIG. 5G in view of FIG. 5F) but this is not necessary; and 5. Next, the tag can be covered by a cover screw 350, 351, 352, 353, or 300 (FIGS. 3C-3H), high temperature epoxy and/or high temperature silicone 510 (FIG. 5G) or, in some cases the tag can be a screw by itself (FIGS. 3I and 3J).

In view of the above mentioned method and in further view of FIGS. 4A-5E, the method of installing the RFID tag "child tag" 200, 300 ("passive RFID equipped mold tag") within a tire mold includes (a) providing a tire mold segment (in this instance "tire mold segment" generally refers to a tire mold ring 410, tire mold shoe/segment 420, a tire mold bladder/bladder plates 430, portions of tire presses, and/or portions of tire extrusion dies), the tire mold segment having a molding surface configured to impart a predetermined shape to a green unvulcanized tire during vulcanization; (b) providing a passive RFID equipped mold tag, the passive RFID equipped mold tag configured to provide a unique RFID identifier associated with the tire mold segment of step (a); (c) forming a recess 401 on a surface of the tire mold segment; and (d) securely positioning the passive RFID equipped mold tag 200 (or 200, 300) within the recess of the surface (e.g., a recess formed on outer surface) of the tire mold segment so that the unique RFID identifier of the passive RFID equipped mold tag is securely associated with the tire mold segment. In view of FIG. 4B and the above mentioned method, the recess 401 of step (c) is defined by sidewalls 402 and a base 403 connected to the sidewalls in which the base 403 is substantially planar. As further shown in FIG. 4B, an outer surface of the passive RFID equipped mold tag 200 is positioned directly on and flush relative to an outer surface of the substantially planar base 403. As further shown in FIGS. 4B, 5A, 5F, and 5H and after directly positioning the RFID equipped mold tag 200, 300 on the outer surface of the substantially planar base 403, the passive RFID equipped mold tag 200, 300 (FIG. 5F) is either flush with or recessed relative to the surface of the tire mold segment on which the recess of step (c) is formed. In certain aspects and as further shown in FIG. 5H, this method may further include applying an epoxy or silicone material 510 over the passive RFID equipped mold tag 200, 300 to securely position and maintain the passive RFID equipped mold tag within the recess formed on the surface of the mold segment.

In certain aspects, the large RFID mold tag (mother tag or "RFID equipped mold tag") 100 is typically applied on the outside of the mold container 500 (FIGS. 11A-11D). There are several ways designed and tested to apply this tag. For example, the large tag may be screwed or riveted to the RFID mother tag on the outside of the container/mold near the existing mold number, or physical license plate of the mold. In this case the positioning of the tag within the press is always the same, facing forward out of the press, and therefore readable within production. Alternatively and instead of screwing the RFID tag onto the mold/container, it is also possible to adhere the large tag onto the surface by using high temperature conductive adhesive or high temperature double sided adhesive tape such as those currently produced by 3M. Since there might be a need to protect the mother by using the mold/container itself, it's also possible to mill a rectangular hole into the container/mold. Within this milled cavity the tag can be applied as described above and is protected by the surface of the mold itself.

In certain additional aspects and to protect the mother tag it is also possible to bend a metal plate into a box having larger dimension(s) than the tag itself. The folded edges of the box will protect the mother tag within daily use (machined or molded metal block with recess for the mother tag is suitable as well). The number and height of the protective sides may impact the RF performance of the asset tag. This exemplary process may include (i) folding a sheet metal "box", with three sides (ii) applying the RFID tag by screw or glue/tape onto the inside surface of the box, and (iii) welding or screwing the box onto the container.

Identifying Molds, Segments, Tooling, and Presses

Figure 6:
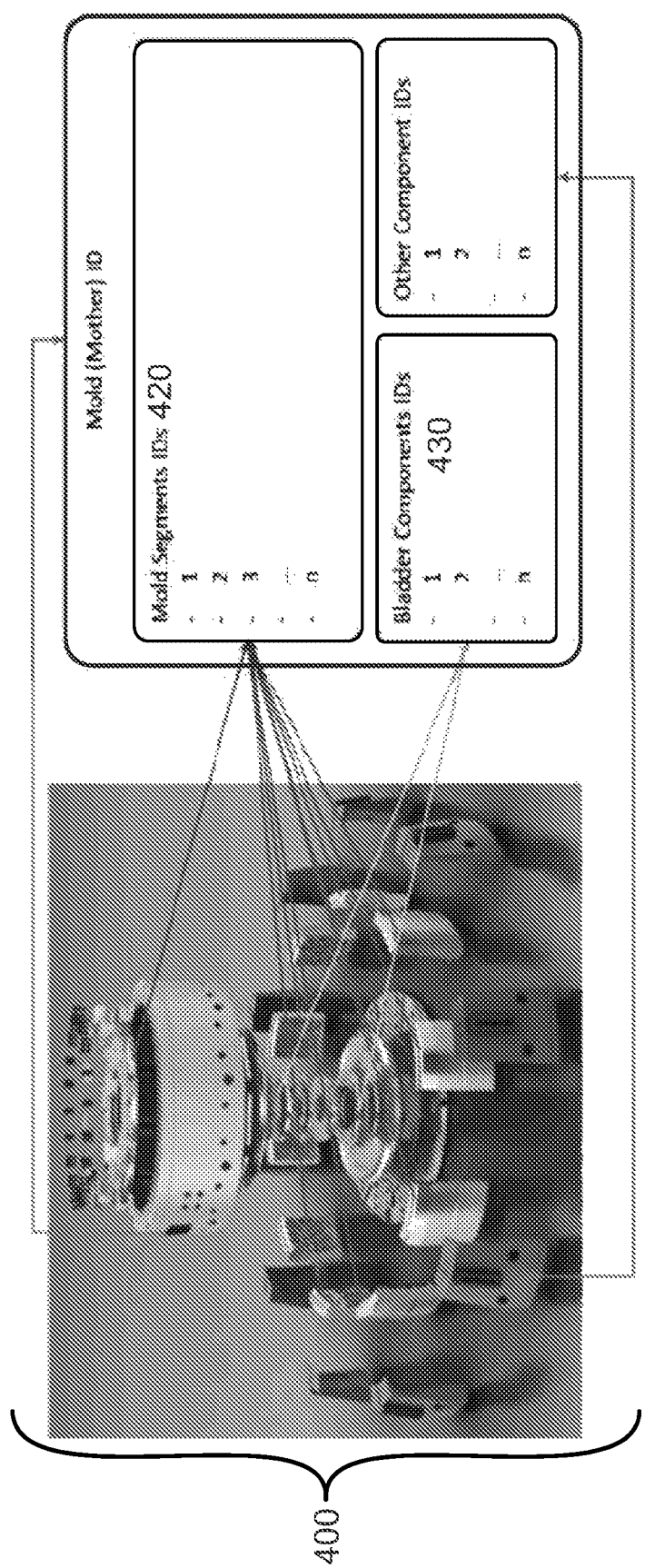
FIG. 6 depicts an exploded view of the mold, mold segments, bladder components, and other components associated with tire manufacture having a plurality of RFID tags with unique identifiers positioned therein.
Figure 7:
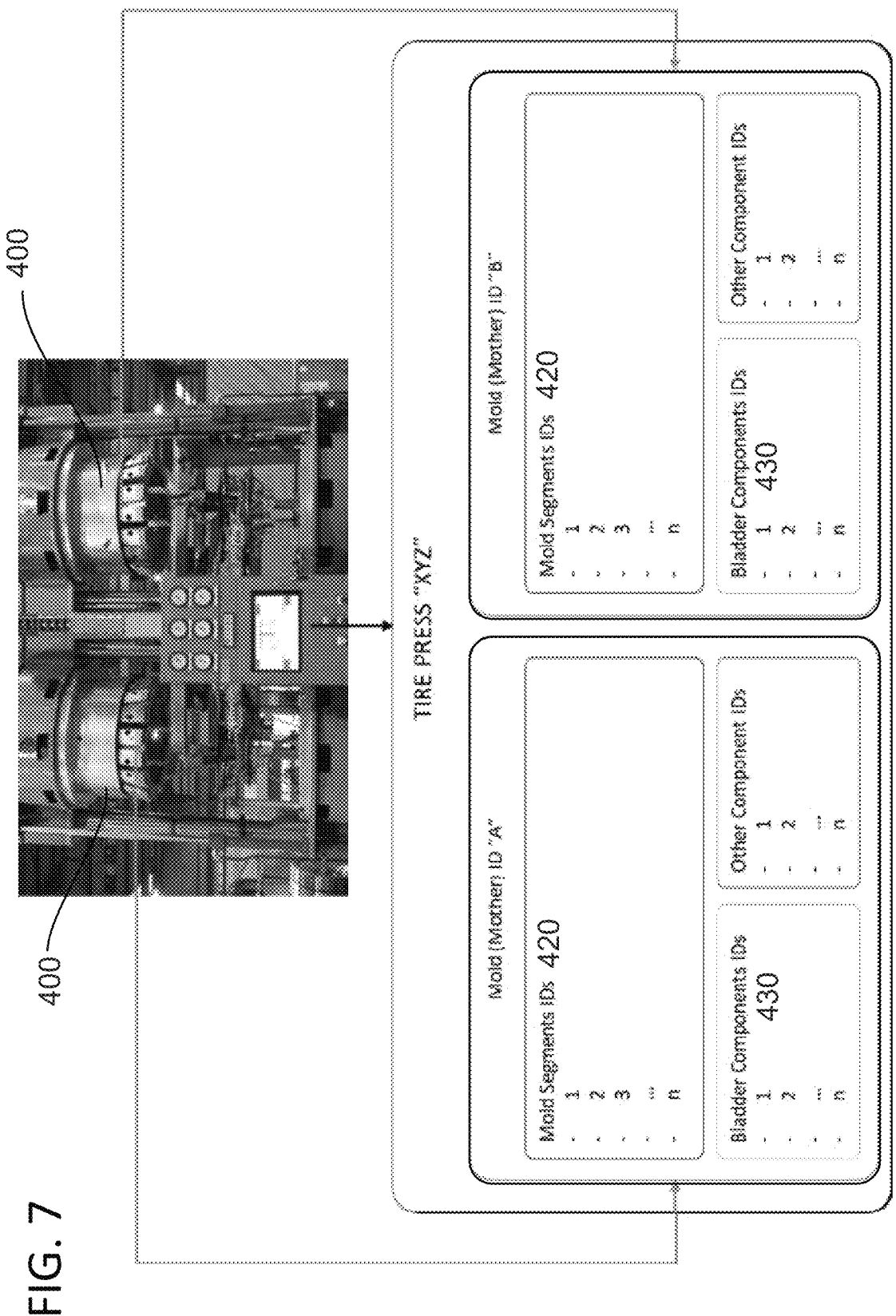
FIG. 7 depicts two parallel oriented tire molds that are each positioned in a tire press with the tire press and parallel oriented tire molds each having a plurality of the disclosed RFID tags positioned therein with each RFID tag having unique identifiers.
Figure 8:
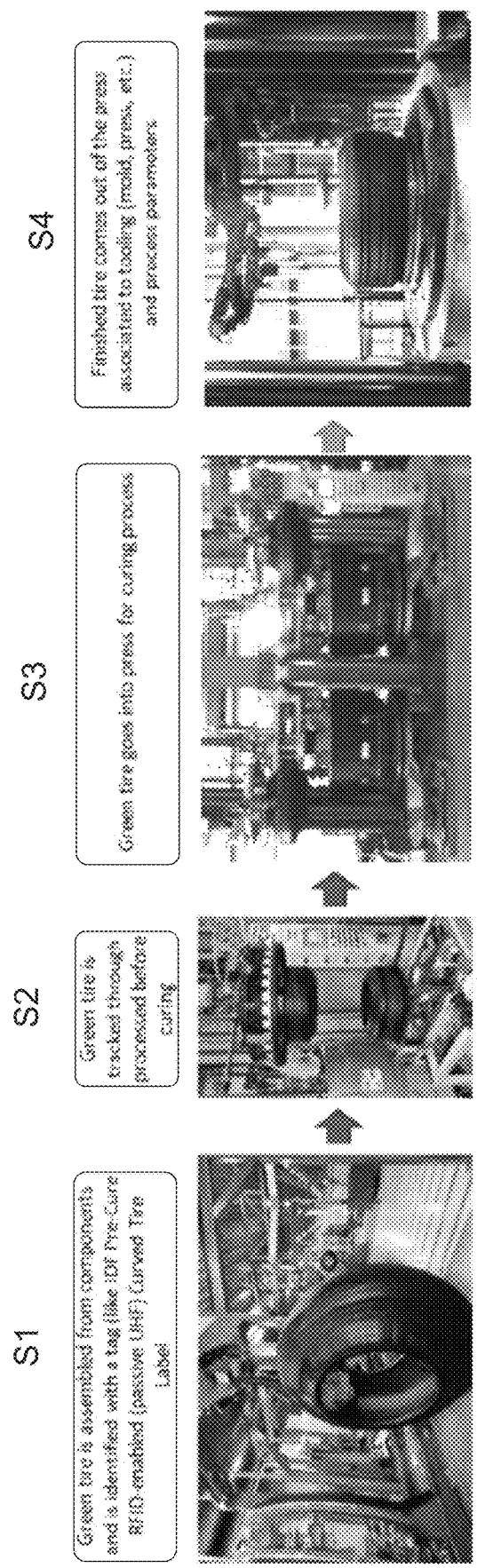
FIG. 8 depicts a simple schematic for overall tire production and tracking using the RFID tags disclosed herein.

In certain aspects and as further depicted in FIGS. 6-8, the RFID tags (i.e., 100, 200, and/or 200, 300) disclosed herein may be included within a computer implemented system configured to readily identify each individual tool, assembly or equipment (i.e., associating the tire mold cover 500 with each tire mold component (tire mold bead ring 410, tire mold shoe/segment 420, tire mold bladder component 430, etc.) associated therewith). Each individual tool, assembly, or equipment preferably includes a chip with any combination of the following electronic memories:

Read only memory typically populated with a unique number also referred to as UID or TID (length and structure varies)

EPC memory with 96-bits or more of memory. The EPC memory can be programmed and optionally password protected or permanently locked Optional user memory which can be programmed and optionally password protected or permanently locked Additional memory locations for optional settings, features and configurations The molds 400, mold bead ring 410, mold segments 420, bladders 430, extruder dies and other tooling or components are uniquely identified (associated with the corresponding child tag and/or passive RFID equipped mold tag 200 (or 200, 300) affixed thereon) by one of the following methods:

1. Unique License Plate—this is a unique number stored in UID, TID, EPC, or User Memory, or a combination of any of these. This unique number serves as a license plate for the item it is identifying. Look up in a database, registry, or item master list that provides the details on such identified item. This database can reside locally, on a local network, remote network, cloud, or similar data retention apparatus.

2. Intelligent Number—this is a unique number typically stored in the EPC, User Memory or the combination of the two, and this intelligent number is assembled according to a definition or a key, and while knowing the definition or a key, one can identify basic information about the item without having to compare the intelligent number to a database, registry, item master, or similar database. This capability is useful in for example instantly matching mold segment to the mold container and identifying the installed order of such segments.

3. GRAI (Global Returnable Asset Identifier), GIAI (Global Individual Asset Identifier), or other industry defined standardized numbering scheme.

In view of FIG. 7, machines such as tire presses are identified by one or a combination of the following methods:
1. RFID component affixed on or near a specific press.
2. One or combination of the following electronic identifications
a. Unique license plate
b. Intelligent number
c. Asset number
d. IP or other network unique address
e. MAC address
f. Any other unique identifier
g. GRAI (Global Returnable Asset Identifier), GIAI (Global Individual Asset Identifier), or other industry defined standardized numbering scheme In view of the above and in further view of FIG. 8, a comprehensive process history, traceability and complete birth certificate of each manufactured tire is possible. In particular FIG. 8 discloses a method for tracking tire manufacture and quality control with an RFID equipped tire mold system including providing an RFID equipped tire mold (e.g., the mold 400 of FIG. 6 having various components tagged with the passive RFID equipped mold tag 200 as shown, for example, in FIGS. 5A, 5B, 5D, and 10A-10C) having a plurality of mold segments and/or mold shoes 420 and/or mold bladder 430 components that, when assembled and having a green unvulcanized tire positioned therein, are configured to impart a predetermined shape to a green unvulcanized tire during vulcanization; (S1) providing a green unvulcanized tire; (S3) placing the green unvulcanized tire into the RFID equipped tire mold; (S4) vulcanizing the green unvulcanized tire within the RFID equipped tire mold thereby forming a vulcanized tire; and removing the vulcanized tire from the tire mold and inspecting the vulcanized tire formed in step and determining whether any defects are present in the vulcanized tire, wherein: if no defects are present in the vulcanized tire after step (e), the vulcanized tire enters a supply chain and all data related to manufacture of the vulcanized tire with no defects is electronically stored within a database for review at a later date if necessary, but if defects are present in the vulcanized tire after after removing the vulcanized tire from the mold, further correlating a defect position on the vulcanized tire with the corresponding position in the RFID equipped tire mold based on unique RFID identifiers provided by the RFID equipped tire mold and further determining whether repair is necessary to portions of the RFID equipped tire mold and/or whether vulcanization parameters should be modified to prevent and/or reduce occurrence of defects in the vulcanized tire(s).

In certain aspects, the RFID equipped tire mold of the above discussed method for tracking tire manufacture and quality control comprises a plurality of passive RFID equipped mold tags 200 (and/or 200, 300) affixed to or within a recess 400 of surface(s) of the plurality of mold segments 420 (and/or mold bladder 430 and/or mold bead rings 410) in a tire mold 400 that define predetermined sectors within the tire mold corresponding to outer surface(s) of the vulcanized tire that, during step (e), are correlated manually and/or electronically with any defects present in the vulcanized tire.

As alluded to above and in certain aspects in the method for tracking tire manufacture and quality control, an RFID equipped mold tag 100 is affixed to an outer surface of a tire mold and/or a tire mold cover 500, the RFID equipped mold tag 100 having a different construction and RFID read range than the passive RFID equipped mold tags 200 (and/or 200, 300) affixed to or within a recess 400 formed on outer surface(s) of the plurality of mold segments 420 (and/or mold bladder 430 and/or mold bead rings 410) and the RFID equipped mold tag 100 configured to communicate unique identifiers associated with the tire mold to which it is attached as well as having unique identifiers associated with the passive RFID equipped mold 200 (200, 300).

In certain aspects, in the method for tracking tire manufacture and quality control, the method may further include locating the RFID equipped tire mold with unique RFID identifiers provided by the RFID equipped mold tag affixed 100 to the outer surface of the tire mold and/or tire mold cover 500.

In certain aspects, in the method for tracking tire manufacture and quality control and, after locating the tire mold but before providing the green unvulcanized tire therein, confirming via unique RFID identifier(s) associated with the plurality of passive RFID equipped mold tags 200 (200, 300), as well as the RFID equipped mold tag 100 affixed to the outer surface of the tire mold/tire mold cover 500, that each mold segment associated with the RFID equipped tire mold having the RFID equipped mold tag is affixed to the outer surface is present.

In certain aspects, in the method for tracking tire manufacture and quality control, if a mold segment is not present, the method further comprises locating the missing mold segment via unique passive RFID identifiers associated therewith and pairing the missing mold segment with the tire mold having the RFID equipped mold tag is affixed to the outer surface.

In certain aspects and before vulcanizing the green tire in the method for tracking tire manufacture and quality control, if an extraneous mold segment (i.e., a mold segment and/or component belonging with another tire mold) having a passive RFID equipped mold tag affixed thereto is present in the tire mold, the method further comprises identifying the extraneous mold segment by a unique RFID identifier associated therewith and pairing the extraneous mold segment with a proper tire mold, the proper tire mold having an RFID equipped mold tag is affixed to an outer surface of the proper tire mold having unique RFID identifiers associated with the proper tire mold to which it is attached as well as having unique identifiers associated with the passive RFID equipped tag affixed to the extraneous mold segment.

Kits with RFID Equipped Mold Tags

Also disclosed herein, and in view of FIGS. 3A-11F, are kits including a passive RFID equipped mold tag 200 (and/or 200, 300) configured to be affixed to or within a recess of a surface (e.g., formed on an outer surface of a tire mold/component including but not limited to a tire mold bead ring, tire mold segment/shoe, tire mold bladder/bladder component plate, etc., the outer surface may include either a portion of the mold that does not mold a tire during vulcanization or the outer surface may include a portion of the mold that molds the tire into a predetermined shape during vulcanization) in a tire mold and configured to withstand repeated thermal expansion and contraction associated with tire vulcanization; and an epoxy or silicone based material 510 configured to permanently affix the passive RFID equipped mold tag to or within the recess of the molding surface in the tire mold, the epoxy or silicone based material configured to withstand repeated thermal expansion and contraction associated with tire vulcanization. In certain aspects, also included in the kit is an RFID equipped mold tag 100 configured to be affixed to an outer surface of a tire mold and/or a tire mold cover 500, the RFID equipped mold tag having a different construction and RFID read range than the passive RFID equipped mold tag and the RFID equipped mold tag configured to communicate unique identifiers associated with the tire mold and/or tire mold cover to which it is attached as well as having unique identifiers associated with the passive RFID equipped mold tag that is configured to be affixed to or within the recess of a tire mold.

RF Capabilities for Disclosed RFID Tags

A typical RFID device generally includes an antenna for wirelessly transmitting and/or receiving RF signals and analog and/or digital electronics operatively connected thereto. So called active or semi-passive RFID devices may also include a battery or other suitable power source. Commonly, the electronics are implemented via an integrated circuit (IC) or microchip or other suitable electronic circuit and may include, e.g., communications electronics, data memory, control logic, etc.

A conventional RFID device will often operate in one of a variety of frequency ranges including, e.g., a low frequency (LF) range (i.e., from approximately 30 kHz to approximately 300 kHz), a high frequency (HF) range (i.e., from approximately 3 MHz to approximately 30 MHz) and an ultra-high frequency (UHF) range (i.e., from approximately 300 MHz to approximately 3 GHz). A passive device will commonly operate in any one of the aforementioned frequency ranges. In particular, for passive devices: LF systems commonly operate at around 124 kHz, 125 kHz or 135 kHz; HF systems commonly operate at around 13.56 MHz; and, UHF systems commonly use a band anywhere from 860 MHz to 960 MHz. Alternately, some passive device systems also use 2.45 GHz and other areas of the radio spectrum. Active RFID devices typically operate at around 455 MHz, 2.45 GHz, or 5.8 GHz. Often, semi-passive devices use a frequency around 2.4 GHz.

The read range of an RFID device (i.e., the range at which the RFID reader can communicate with the RFID device) is generally determined by many factors, e.g., the type of device (i.e., active, passive, etc.). Typically, passive LF RFID devices (also referred to as LFID or LowFID devices) can usually be read from within approximately 12 inches (0.33 meters); passive HF RFID devices (also referred to as HFID or HighFID devices) can usually be read from up to approximately 3 feet (1 meter); and passive UHF RFID devices (also referred to as UHFID devices) can be typically read from approximately 10 feet (3.05 meters) or more. One important factor influencing the read range for passive RFID devices is the method used to transmit data from the device to the reader, i.e., the coupling mode between the device and the reader—which can typically be either inductive coupling or radiative/propagation coupling. Passive LFID devices and passive HFID devices commonly use inductive coupling between the device and the reader, whereas passive UHFID devices commonly use radiative or propagation coupling between the device and the reader.

Alternately, in radiative or propagation coupling applications (e.g., as are conventionally used by passive UHFID devices), rather than forming an electromagnetic field between the respective antennas of the reader and device, the reader emits electromagnetic energy which illuminates the device. In turn, the device gathers the energy from the reader via its antenna, and the device's IC or microchip uses the gathered energy to change the load on the device antenna and reflect back an altered signal, i.e., backscatter. Commonly, UHFID devices can communicate data in a variety of different ways, e.g., they can increase the amplitude of the reflected wave sent back to the reader (i.e., amplitude shift keying), shift the reflected wave so it is out of phase received wave (i.e., phase shift keying) or change the frequency of the reflected wave (i.e., frequency shift keying). In any event, the reader picks up the backscattered signal and converts the altered wave into data that is understood by the reader or adjunct computer.

The antenna employed in an RFID device is also commonly affected by numerous factor, e.g., the intended application, the type of device (i.e., active, passive, semi-active, etc.), the desired read range, the device-to-reader coupling mode, the frequency of operation of the device, etc. For example, insomuch as passive LFID devices are normally inductively coupled with the reader, and because the voltage induced in the device antenna is proportional to the operating frequency of the device, passive LFID devices are typically provisioned with a coil antenna having many turns in order to produce enough voltage to operate the device's IC or microchip. Comparatively, a conventional HFID passive device will often be provisioned with an antenna which is a planar spiral (e.g., with 5 to 7 turns over a credit-card-sized form factor), which can usually provide read ranges on the order of tens of centimeters. Commonly, HFID antenna coils can be less costly to produce (e.g., compared to LFID antenna coils), since they can be made using techniques relatively less expensive than wire winding, e.g., lithography or the like. UHFID passive devices are usually radioactively and/or propagationally-coupled with the reader antenna and consequently can often employ conventional dipole-like antennas The foregoing description provides embodiments of the invention by way of example only. It is envisioned that other embodiments may perform similar functions and/or achieve similar results.

What is claimed is:

1. A kit comprising:
   (a) a passive RFID equipped mold tag configured to be affixed to or within a recess of a surface in a tire mold and configured to withstand repeated thermal expansion and contraction associated with tire vulcanization;
   (b) an epoxy or silicone based material configured to permanently affix the passive RFID equipped mold tag to or within the recess of the surface in the tire mold, the epoxy or silicone based material configured to withstand repeated thermal expansion and contraction associated with tire vulcanization; and
   (c) an RFID equipped mold tag configured to be affixed to an outer surface of a tire mold and/or a tire mold cover, the RFID equipped mold tag having a different construction and RFID read range than the passive RFID equipped mold tag and the RFID equipped mold tag configured to communicate unique identifiers associated with the tire mold and/or tire mold cover to which it is attached as well as having unique identifiers associated with the passive RFID equipped mold tag that is configured to be affixed to or within the recess of a tire mold; wherein:
   the passive RFID equipped mold tag configured to be affixed to or within the recess of the surface in the tire mold comprises:
      (i) a passive RFID device configured for a passive RFID read range from 5 to 20 centimeters away from the passive RFID device; and
      (ii) a rigid housing completely housing the RFID device therein and is configured to withstand repeated thermal expansion and contraction associated with tire vulcanization.

2. The kit of claim 1, wherein the rigid housing is formed of metal or metal alloy, a ceramic material, or a rigid polymer and includes a recess formed therein for receiving and housing the passive RFID device completely within the rigid housing.

3. The kit of claim 2, wherein the passive RFID device is permanently affixed to and housed within the rigid housing.

4. The kit of claim 3, wherein the rigid housing of the passive RFID equipped mold tag includes a planar head configured to house the passive RFID device therein and an elongate portion attached to and extending away from the planar head.

5. The kit of claim 4, wherein the elongate portion is configured to anchor the passive RFID equipped mold tag in the recess of the surface in the tire mold.

6. The kit of claim 5, wherein the elongate portion has a threaded outer diameter.

7. The kit of claim 2, wherein the passive RFID device is removably positioned within the rigid housing.

8. The kit of claim 7, wherein the rigid housing of the passive RFID equipped mold tag includes a planar head configured to removably house the passive RFID device therein and an elongate portion attached to and extending away from the planar head.

9. The kit of claim 8, wherein the planar head of the rigid housing of the passive RFID equipped mold tag includes a recessed portion configured to receive a removable press-fit or friction fit insert therein, the press-fit or friction fit insert including the passive RFID device therein.

10. The kit of claim 9, wherein the elongate portion is configured to anchor the passive RFID equipped mold tag in the recess of the surface in the tire mold.

11. The kit of claim 10, wherein the elongate portion has a threaded outer diameter.

12. The kit of claim 1, wherein the RFID equipped mold tag configured to be affixed to an outer surface of a tire mold has a read range ranging from 0.25 meters to 10 meters away from the RFID equipped mold tag.

13. The kit of claim 12, wherein the RFID equipped mold tag comprises a flexible substrate and an RFID device embedded therein.

14. The kit of claim 13, wherein at least one outer surface of the flexible substrate of the RFID equipped mold tag is coated with silicone adhesive or epoxy adhesive for affixing the RFID equipped mold tag to the outer surface of the tire mold or the RFID equipped mold tag is configured for affixing to the outer surface of the tire mold by a fastener.

15. The kit of claim 14, wherein the RFID device of the RFID equipped mold tag is equipped for passive RFID.

16. The kit of claim 15, wherein the RFID device of the RFID equipped mold tag is configured to identify a location of the tire mold and each specific tire mold components positioned therein as identified by unique identifiers associated with the passive RFID equipped mold tag, and the passive RFID equipped mold tags configured to communicate unique identifiers associated with individual components of the tire mold, the individual components comprising at least one of a mold shoe, a mold bead ring, mold bladder, or mold segment.

* * * * *